United States Patent
Partovi

(10) Patent No.: US 11,114,886 B2
(45) Date of Patent: Sep. 7, 2021

(54) POWERING OR CHARGING SMALL-VOLUME OR SMALL-SURFACE RECEIVERS OR DEVICES

(71) Applicant: Afshin Partovi, Palo Alto, CA (US)

(72) Inventor: Afshin Partovi, Palo Alto, CA (US)

(73) Assignee: Mojo Mobility, Inc., Palo Alto, CA (US)

(*) Notice: Subject to any disclaimer, the term of this patent is extended or adjusted under 35 U.S.C. 154(b) by 0 days.

(21) Appl. No.: 16/819,503

(22) Filed: Mar. 16, 2020

(65) Prior Publication Data

US 2020/0215925 A1 Jul. 9, 2020

Related U.S. Application Data

(63) Continuation of application No. 15/830,411, filed on Dec. 4, 2017, now Pat. No. 10,594,155, which is a
(Continued)

(51) Int. Cl.
*H02J 50/70* (2016.01)
*H02J 7/02* (2016.01)
(Continued)

(52) U.S. Cl.
CPC .............. *H02J 7/025* (2013.01); *B60L 53/12* (2019.02); *H01F 38/14* (2013.01); *H02J 50/12* (2016.02);
(Continued)

(58) Field of Classification Search
USPC ......................................................... 320/108
See application file for complete search history.

(56) References Cited

U.S. PATENT DOCUMENTS

| 3,938,018 A | 2/1976 | Dahl |
| 4,311,853 A | 1/1982 | Cree |

(Continued)

FOREIGN PATENT DOCUMENTS

| JP | 408000838 | 8/1996 |
| JP | 2000341885 | 8/2000 |

(Continued)

OTHER PUBLICATIONS

WiPower, Wikipedia, the free encyclopedia, http://en.wikipedia.org/wiki/WiPower, Nov. 18, 2011, 2 pages.
(Continued)

*Primary Examiner* — Bryce M Aisaka
(74) *Attorney, Agent, or Firm* — Louis Wu

(57) ABSTRACT

Provided is a wireless power receiver for powering or charging an electric or electronic device or battery or a mobile electronic system such as a vehicle or robot. The receiver may consist of or consist essentially of a receiver coil of a blade or thin solenoid shape/geometry that includes a larger surface in a first dimension and a smaller surface in a second and/or third dimension, which receives power inductively from a wireless charger. The charger may be a source of an alternating magnetic field to charge or power one or multiple wireless power receivers or devices having small surface areas or volumes. The receiver coil has the smaller surface facing a charging surface of the charger. The wireless charger may include a charger coil designed to provide a substantially uniform magnetic field over an area larger than 50% of the charger surface.

19 Claims, 12 Drawing Sheets

Related U.S. Application Data continuation of application No. 14/252,627, filed on Apr. 14, 2014, now Pat. No. 9,837,846.

(60) Provisional application No. 61/811,638, filed on Apr. 12, 2013.

(51) Int. Cl.

| | | |
|---|---|---|
| *H02J 50/12* | (2016.01) | |
| *H02J 50/40* | (2016.01) | |
| *H02J 50/90* | (2016.01) | |
| *H01F 38/14* | (2006.01) | |
| *B60L 53/12* | (2019.01) | |

(52) U.S. Cl.
CPC .............. *H02J 50/40* (2016.02); *H02J 50/70* (2016.02); *H02J 50/90* (2016.02)

(56) References Cited

U.S. PATENT DOCUMENTS

| | | | |
|---|---|---|---|
| 4,311,953 A | 1/1982 | Fukuda | |
| 4,415,959 A | 11/1983 | Vinciarelli | |
| 4,731,585 A | 3/1988 | Fox | |
| 4,800,328 A | 1/1989 | Bolger | |
| 4,873,677 A | 10/1989 | Sakamoto et al. | |
| 5,237,257 A | 8/1993 | Johnson | |
| 5,311,973 A | 5/1994 | Tseng | |
| 5,367,242 A | 11/1994 | Hulman | |
| 5,434,493 A | 7/1995 | Woody | |
| 5,455,466 A | 10/1995 | Parks | |
| 5,543,702 A | 8/1996 | Pfeiffer | |
| 5,550,452 A | 8/1996 | Shirai | |
| 5,600,225 A | 2/1997 | Goto | |
| 5,642,087 A | 6/1997 | Crow | |
| 5,656,917 A | 8/1997 | Theobald | |
| 5,696,433 A | 12/1997 | Palino | |
| 5,734,254 A | 3/1998 | Stephens | |
| 5,744,933 A | 4/1998 | Inoue | |
| 5,889,384 A | 5/1999 | Hayes | |
| 5,925,814 A | 7/1999 | Tsuzuki | |
| 5,952,814 A | 9/1999 | Van Lerbergne | |
| 5,959,433 A | 9/1999 | Rohde | |
| 5,963,012 A | 10/1999 | Garcia | |
| 5,991,170 A | 11/1999 | Nagai | |
| 5,991,665 A | 11/1999 | Wang | |
| 6,008,622 A | 12/1999 | Nakawatase | |
| 6,016,046 A | 1/2000 | Kaile | |
| 6,040,680 A | 3/2000 | Toya | |
| 6,094,119 A | 7/2000 | Reznik | |
| 6,184,651 B1 | 2/2001 | Fernandez et al. | |
| 6,184,654 B1 | 2/2001 | Bachner | |
| 6,208,115 B1 | 3/2001 | Binder | |
| 6,301,128 B1 | 10/2001 | Jang | |
| 6,310,465 B2 | 10/2001 | Najima | |
| 6,331,744 B1 | 12/2001 | Chen | |
| 6,436,299 B1 | 8/2002 | Baarman | |
| 6,462,509 B1 | 10/2002 | Abe | |
| 6,489,745 B1 | 12/2002 | Koreis | |
| 6,498,455 B2 | 12/2002 | Zink | |
| 6,501,364 B1 | 12/2002 | Hui | |
| 6,573,817 B2 | 6/2003 | Gottschalk | |
| 6,586,909 B1 | 7/2003 | Trepka | |
| 6,625,477 B1 | 9/2003 | Wakefield | |
| 6,636,017 B2 | 10/2003 | Zink | |
| 6,650,088 B1 | 11/2003 | Webb | |
| 6,673,250 B2 | 1/2004 | Kuennen | |
| 6,697,272 B2 | 2/2004 | Nanbu | |
| 6,731,071 B2 | 5/2004 | Baarman | |
| 6,741,064 B2 | 5/2004 | Liu | |
| 6,756,765 B2 | 6/2004 | Bruning | |
| 6,798,716 B1 | 9/2004 | Charych | |
| 6,803,744 B1 | 10/2004 | Sabo | |
| 6,803,774 B2 | 10/2004 | Park | |
| 6,806,649 B2 | 10/2004 | Mollema | |
| 6,812,645 B2 | 11/2004 | Baarman | |
| 6,825,620 B2 | 11/2004 | Kuennen | |
| 6,831,417 B2 | 12/2004 | Baarman | |
| 6,844,702 B2 | 1/2005 | Giannopoulos | |
| 6,870,089 B1 | 3/2005 | Gray | |
| 6,888,438 B2 | 5/2005 | Hui | |
| 6,906,495 B2 | 6/2005 | Cheng | |
| 6,913,477 B2 | 7/2005 | Dayan | |
| 6,917,163 B2 | 7/2005 | Baarman | |
| 6,917,182 B2 | 7/2005 | Burton | |
| 6,943,733 B2 | 9/2005 | Vance | |
| 6,972,543 B1 | 12/2005 | Wells | |
| 6,975,198 B2 | 12/2005 | Baarman | |
| 7,026,789 B2 | 4/2006 | Bozzone | |
| 7,031,662 B2 | 4/2006 | Suzuki | |
| 7,042,196 B2 | 5/2006 | Cheng | |
| 7,116,200 B2 | 10/2006 | Baarman | |
| 7,118,240 B2 | 10/2006 | Baarman | |
| 7,126,450 B2 | 10/2006 | Baarman | |
| 7,132,918 B2 | 11/2006 | Baarman | |
| 7,151,357 B2 | 12/2006 | Xian | |
| 7,162,264 B2 | 1/2007 | Vance | |
| 7,164,245 B1 | 1/2007 | Chen | |
| 7,164,255 B2 | 1/2007 | Hui | |
| 7,183,870 B2 | 2/2007 | Takagi | |
| 7,184,706 B2 | 2/2007 | Someya | |
| 7,209,084 B2 | 4/2007 | Lindell | |
| 7,211,986 B1 * | 5/2007 | Flowerdew | H02J 50/12 320/108 |
| 7,221,919 B2 | 5/2007 | Takagi | |
| 7,239,110 B2 | 7/2007 | Cheng | |
| 7,248,017 B2 | 7/2007 | Cheng | |
| 7,305,258 B2 | 12/2007 | Rydgren | |
| 7,311,526 B2 | 12/2007 | Rohrbach | |
| 7,324,051 B2 | 1/2008 | Hayes | |
| 7,336,054 B2 | 2/2008 | Crisp | |
| 7,342,539 B2 | 3/2008 | Rosenberg | |
| 7,352,567 B2 | 4/2008 | Hotelling et al. | |
| 7,355,150 B2 | 4/2008 | Baarman | |
| 7,376,408 B2 | 5/2008 | Hayes | |
| 7,378,817 B2 | 5/2008 | Calhoon | |
| 7,382,636 B2 | 6/2008 | Baarman | |
| 7,385,357 B2 | 6/2008 | Kuennen | |
| 7,388,543 B2 | 6/2008 | Vance | |
| 7,399,202 B2 | 7/2008 | Dayan | |
| 7,415,248 B2 | 8/2008 | Andersson | |
| 7,375,493 B2 | 10/2008 | Calhoon et al. | |
| 7,443,135 B2 | 10/2008 | Cho | |
| 7,462,951 B1 | 12/2008 | Baarman | |
| 7,477,195 B2 | 1/2009 | Vance | |
| 7,487,921 B2 | 2/2009 | Takahashi | |
| 7,495,414 B2 | 2/2009 | Hui | |
| 7,498,871 B2 | 3/2009 | Ruuswik | |
| 7,525,283 B2 | 4/2009 | Cheng | |
| 7,554,316 B2 | 6/2009 | Stevens | |
| 7,576,514 B2 | 8/2009 | Hui | |
| 7,605,496 B2 | 10/2009 | Stevens | |
| D603,603 S | 11/2009 | Laine | |
| D607,879 S | 1/2010 | Ferber | |
| 7,645,143 B2 | 1/2010 | Rohrbach | |
| D611,407 S | 3/2010 | Webb | |
| D611,408 S | 3/2010 | Ferber | |
| 7,733,215 B2 | 6/2010 | Kozuma et al. | |
| 7,741,734 B2 | 6/2010 | Joannopoulos | |
| 7,781,916 B2 | 8/2010 | Boys | |
| D624,316 S | 9/2010 | Ferber | |
| 7,804,054 B2 | 9/2010 | Shalom | |
| D625,721 S | 10/2010 | Ferber | |
| 7,825,543 B2 | 11/2010 | Karalis | |
| 7,855,529 B2 | 12/2010 | Liu | |
| 7,872,445 B2 | 1/2011 | Hui | |
| 7,906,936 B2 | 3/2011 | Azancot | |
| 7,915,858 B2 | 3/2011 | Liu | |
| D636,333 S | 4/2011 | Kulikowski | |
| 7,948,208 B2 | 5/2011 | Partovi | |
| 7,952,322 B2 | 5/2011 | Partovi | |
| D639,734 S | 6/2011 | Ferber | |
| 8,035,255 B2 | 10/2011 | Kurs | |
| 8,040,103 B2 | 10/2011 | Hui | |

(56) References Cited

U.S. PATENT DOCUMENTS

| | | |
|---|---|---|
| 8,049,370 B2 | 11/2011 | Azancot |
| 8,050,068 B2 | 11/2011 | Hussmann |
| 8,069,100 B2 | 11/2011 | Taylor et al. |
| 8,169,185 B2 | 5/2012 | Partovi |
| 8,234,189 B2 | 7/2012 | Taylor et al. |
| 2002/0004167 A1 | 1/2002 | Jenson |
| 2002/0067238 A1 | 6/2002 | Leu |
| 2002/0089305 A1 | 7/2002 | Park |
| 2002/0093309 A1 | 7/2002 | Peele |
| 2003/0094921 A1 | 5/2003 | Lau |
| 2003/0103039 A1 | 6/2003 | Burr |
| 2003/0210106 A1 | 11/2003 | Cheng |
| 2003/0214255 A1 | 11/2003 | Baarman |
| 2004/0113589 A1 | 6/2004 | Crisp |
| 2004/0130915 A1 | 7/2004 | Baarman |
| 2004/0130916 A1 | 7/2004 | Baarman |
| 2004/0145342 A1 | 7/2004 | Lyon |
| 2004/0145343 A1 | 7/2004 | Naskali |
| 2004/0150934 A1 | 8/2004 | Baarman |
| 2004/0222751 A1 | 11/2004 | Mollema |
| 2004/0232845 A1 | 11/2004 | Baarman |
| 2005/0007067 A1 | 1/2005 | Baarman |
| 2005/0017677 A1 | 1/2005 | Burton |
| 2005/0063488 A1 | 3/2005 | Troyk |
| 2005/0075696 A1 | 4/2005 | Forsberg |
| 2005/0093475 A1 | 5/2005 | Kuennen |
| 2005/0116650 A1 | 6/2005 | Baarman |
| 2005/0116683 A1 | 6/2005 | Cheng |
| 2005/0122058 A1 | 6/2005 | Baarman |
| 2005/0122059 A1 | 6/2005 | Baarman |
| 2005/0127849 A1 | 6/2005 | Baarman |
| 2005/0127850 A1 | 6/2005 | Baarman |
| 2005/0127867 A1 | 6/2005 | Calhoon |
| 2005/0127869 A1 | 6/2005 | Calhoon |
| 2005/0135122 A1 | 6/2005 | Cheng |
| 2005/0140482 A1 | 6/2005 | Cheng |
| 2005/0162125 A1 | 7/2005 | Yu |
| 2005/0189910 A1 | 9/2005 | Hui |
| 2006/0021926 A1 | 2/2006 | Woodard |
| 2006/0038794 A1 | 2/2006 | Schneidman |
| 2006/0105718 A1 | 5/2006 | Ozluturk |
| 2006/0106965 A1 | 5/2006 | Falcon |
| 2006/0108977 A1 | 5/2006 | Kagermeier |
| 2006/0132045 A1 | 6/2006 | Baarman |
| 2006/0146517 A1 | 7/2006 | Park |
| 2006/0202665 A1 | 9/2006 | Hsu |
| 2006/0205381 A1 | 9/2006 | Beart |
| 2006/0238930 A1 | 10/2006 | Baarman |
| 2006/0284593 A1 | 12/2006 | Nagy |
| 2007/0029965 A1 | 2/2007 | Hui |
| 2007/0069687 A1 | 3/2007 | Suzuki |
| 2007/0109708 A1 | 5/2007 | Hussman |
| 2007/0139000 A1 | 6/2007 | Kozuma |
| 2007/0178945 A1 | 8/2007 | Cook |
| 2007/0182367 A1 | 8/2007 | Partovi |
| 2007/0236174 A1 | 10/2007 | Kaye |
| 2007/0279002 A1 | 12/2007 | Partovi |
| 2007/0296393 A1 | 12/2007 | Malpas |
| 2008/0014897 A1 | 1/2008 | Cook |
| 2008/0067874 A1 | 3/2008 | Tseng |
| 2008/0164839 A1 | 7/2008 | Kato |
| 2008/0247210 A1 | 10/2008 | Hu |
| 2008/0258679 A1 | 10/2008 | Manico |
| 2008/0272889 A1 | 11/2008 | Symons |
| 2008/0278264 A1 | 11/2008 | Karalis |
| 2009/0015075 A1 | 1/2009 | Cook |
| 2009/0033564 A1 | 2/2009 | Cook |
| 2009/0043727 A1 | 2/2009 | Cohen, Jr. |
| 2009/0049554 A1 | 2/2009 | Vuong |
| 2009/0058189 A1 | 3/2009 | Cook |
| 2009/0072627 A1 | 3/2009 | Cook |
| 2009/0072628 A1 | 3/2009 | Cook |
| 2009/0072629 A1 | 3/2009 | Cook |
| 2009/0079268 A1 | 3/2009 | Cook |
| 2009/0096413 A1 | 4/2009 | Partovi |
| 2009/0102292 A1 | 4/2009 | Cook |
| 2009/0127937 A1 | 5/2009 | Widmer |
| 2009/0134712 A1 | 5/2009 | Cook |
| 2009/0167449 A1 | 7/2009 | Cook |
| 2009/0174263 A1 | 7/2009 | Baarman et al. |
| 2009/0195332 A1 | 8/2009 | Joannopoulos |
| 2009/0195333 A1 | 8/2009 | Joannopoulos |
| 2009/0212636 A1 | 8/2009 | Cook |
| 2009/0212637 A1 | 8/2009 | Baarman et al. |
| 2009/0212639 A1 | 8/2009 | Johnson |
| 2009/0213028 A1 | 8/2009 | Cook |
| 2009/0224608 A1 | 9/2009 | Cook |
| 2009/0224609 A1 | 9/2009 | Cook |
| 2009/0224856 A1 | 9/2009 | Karalis |
| 2009/0243397 A1 | 10/2009 | Cook |
| 2009/0257259 A1 | 10/2009 | Leibovitz |
| 2009/0267709 A1 | 10/2009 | Joannopoulos |
| 2009/0267710 A1 | 10/2009 | Joannopoulos |
| 2009/0284083 A1 | 11/2009 | Karalis |
| 2009/0284227 A1 | 11/2009 | Mohammadian |
| 2010/0007307 A1 | 1/2010 | Baarman |
| 2010/0038970 A1 | 2/2010 | Cook |
| 2010/0066176 A1 | 3/2010 | Azancot |
| 2010/0070219 A1 | 3/2010 | Azancot |
| 2010/0072825 A1 | 3/2010 | Azancot |
| 2010/0073177 A1 | 3/2010 | Azancot |
| 2010/0081473 A1 | 4/2010 | Chatterjee |
| 2010/0096934 A1 | 4/2010 | Joannopoulos |
| 2010/0102639 A1 | 4/2010 | Joannopoulos |
| 2010/0102640 A1 | 4/2010 | Joannopoulos |
| 2010/0102641 A1 | 4/2010 | Joannopoulos |
| 2010/0109443 A1 | 5/2010 | Cook |
| 2010/0109445 A1 | 5/2010 | Kurs |
| 2010/0117454 A1 | 5/2010 | Cook |
| 2010/0117455 A1 | 5/2010 | Joannopoulos |
| 2010/0117456 A1 | 5/2010 | Karalis |
| 2010/0117596 A1 | 5/2010 | Cook |
| 2010/0123353 A1 | 5/2010 | Joannopoulos |
| 2010/0123354 A1 | 5/2010 | Joannopoulos |
| 2010/0123355 A1 | 5/2010 | Joannopoulos |
| 2010/0127573 A1 | 5/2010 | Joannopoulos |
| 2010/0127574 A1 | 5/2010 | Joannopoulos |
| 2010/0127575 A1 | 5/2010 | Joannopoulos |
| 2010/0127660 A1 | 5/2010 | Cook |
| 2010/0133918 A1 | 6/2010 | Joannopoulos |
| 2010/0133919 A1 | 6/2010 | Joannopoulos |
| 2010/0133920 A1 | 6/2010 | Joannopoulos |
| 2010/0141042 A1 | 6/2010 | Kesler |
| 2010/0148589 A1 | 6/2010 | Hamam |
| 2010/0164296 A1 | 7/2010 | Kurs |
| 2010/0164297 A1 | 7/2010 | Kurs |
| 2010/0164298 A1 | 7/2010 | Karalis |
| 2010/0171368 A1 | 7/2010 | Schatz |
| 2010/0171369 A1 | 7/2010 | Taylor et al. |
| 2010/0181841 A1 | 7/2010 | Azancot |
| 2010/0181843 A1 | 7/2010 | Schatz |
| 2010/0181845 A1 | 7/2010 | Fiorello |
| 2010/0184371 A1 | 7/2010 | Cook |
| 2010/0187911 A1 | 7/2010 | Joannopoulos |
| 2010/0190435 A1 | 7/2010 | Cook |
| 2010/0190436 A1 | 7/2010 | Cook |
| 2010/0194336 A1 | 8/2010 | Azancot |
| 2010/0201313 A1 | 8/2010 | Vorenkamp |
| 2010/0207572 A1 | 8/2010 | Kirby |
| 2010/0207771 A1 | 8/2010 | Trigiani |
| 2010/0213895 A1 | 8/2010 | Keating |
| 2010/0219183 A1 | 9/2010 | Azancot |
| 2010/0219693 A1 | 9/2010 | Azancot |
| 2010/0219697 A1 | 9/2010 | Azancot |
| 2010/0219698 A1 | 9/2010 | Azancot |
| 2010/0235006 A1 | 9/2010 | Brown |
| 2010/0244584 A1 | 9/2010 | Azancot |
| 2010/0253281 A1 | 10/2010 | Li |
| 2010/0253282 A1 | 10/2010 | Azancot |
| 2010/0257382 A1 | 10/2010 | Azancot |
| 2010/0259401 A1 | 10/2010 | Azancot |
| 2010/0277120 A1 | 11/2010 | Cook |
| 2010/0277121 A1 | 11/2010 | Hall |
| 2010/0314946 A1 | 12/2010 | Budde |

(56) References Cited

U.S. PATENT DOCUMENTS

| | | | |
|---|---|---|---|
| 2010/0327804 A1 | 12/2010 | Takahashi | |
| 2011/0012556 A1 | 1/2011 | Lai | |
| 2011/0050164 A1 | 3/2011 | Partovi | |
| 2011/0057606 A1 | 3/2011 | Saunamaki | |
| 2011/0062793 A1 | 3/2011 | Azancot | |
| 2011/0090723 A1 | 4/2011 | Hu | |
| 2011/0095617 A1 | 4/2011 | Cook | |
| 2011/0115430 A1 | 5/2011 | Saunamaki | |
| 2011/0121660 A1 | 5/2011 | Azancot | |
| 2011/0157137 A1 | 6/2011 | Ben-Shalom | |
| 2011/0187318 A1 | 8/2011 | Hui | |
| 2011/0193520 A1 | 8/2011 | Yamazaki | |
| 2011/0217927 A1 | 9/2011 | Ben-Shalom | |
| 2011/0221387 A1 | 9/2011 | Steigerwald | |
| 2011/0221391 A1 | 9/2011 | Won | |
| 2011/0222493 A1 | 9/2011 | Mangold | |
| 2011/0266878 A9 | 11/2011 | Cook | |
| 2012/0041843 A1 | 2/2012 | Taylor et al. | |
| 2012/0047972 A1* | 3/2012 | Grant | E05B 45/00 70/77 |
| 2012/0049991 A1 | 3/2012 | Baarman | |
| 2012/0112552 A1 | 5/2012 | Baarman et al. | |
| 2012/0119588 A1 | 5/2012 | Baarman et al. | |
| 2012/0126745 A1 | 5/2012 | Partovi | |
| 2012/0146576 A1 | 6/2012 | Partovi | |
| 2012/0150670 A1 | 6/2012 | Taylor et al. | |
| 2012/0235636 A1 | 9/2012 | Partovi | |
| 2012/0259735 A1 | 10/2012 | Taylor et al. | |
| 2014/0339916 A1 | 11/2014 | Fells et al. | |

FOREIGN PATENT DOCUMENTS

| | | |
|---|---|---|
| JP | 2000341885 | 12/2000 |
| JP | 2003045731 | 2/2003 |
| JP | 2006500894 | 1/2006 |
| JP | 2006246633 | 9/2006 |
| JP | 2009200174 | 9/2009 |
| JP | 2011103541 | 5/2011 |
| JP | 408000838 | 11/2011 |
| JP | 2012527800 | 11/2012 |
| KR | 100836634 | 4/2008 |
| KR | 100836634 | 6/2008 |
| WO | 2003096361 | 11/2003 |
| WO | 2003096512 | 11/2003 |
| WO | 2003105308 | 12/2003 |
| WO | 20030105311 | 12/2003 |
| WO | 2004030176 | 4/2004 |
| WO | 2004038887 | 5/2004 |
| WO | 2004038888 | 5/2004 |
| WO | 2004055654 | 7/2004 |
| WO | 2005024865 | 3/2005 |
| WO | 2005109597 | 11/2005 |
| WO | 2005109598 | 11/2005 |
| WO | 2008137996 | 11/2008 |
| WO | WO-2010133253 | 11/2010 |
| WO | 20110156768 | 12/2011 |
| WO | 201200116054 | 8/2012 |

OTHER PUBLICATIONS

PowerbyProxi, Wireless Power Solutions, http://www.powerbyproxi.com/, Nov. 18, 2011, 2 pages.
Now charge your iPhone 4 and 4S with Powermat!, Wireless charging mats and receivers for your iPhone, iPod, Blackberry . . . http://www.powermat.com/, Nov. 18, 2011, 1 page.
Witricity. Wireless Electricity Delivered Over Distance, http://www.witricity.com, Nov. 18, 2011, 1 page.
ConvenientPower, ConvenientPower HK Limited, http://www.convenientpower.com/1/about.php, Nov. 18, 2011, 1 page.
Nigel Power LLC: Private Company Information—Business Week, http://investing.businessweek.com/research/stocks/private/snapshot.asp? p . . . , Nov. 18, 2011, 2 pages.
Sakamoto, et al., "A Novel Circuit for Non-Contact Charging Through Electro-Magnetic Coupling", 1992, IEEE, pp. 165-17 4.
Abe, et al., "A Non-Contact Charger Using a Resonant Converter with Parallel Capacitor of the Secondary Coil", Apr. 2000, IEEE, vol. 36, No. 2, pp. 444-451.
Sakamoto, et al. "Large Air-Gap Coupler for Inductive Charger", Sep. 1999, IEEE, vol. 35, No. 5, pp. 3526-3528.
Sakamoto, et al. "A Novel Converter for Non-Contact Charging with Electromagnetic Coupling", Nov. 1993, IEEE, vol. 29, No. 6, pp. 3228-3230.
Kim, et al. "Design of a Contaclless Battery Charger for Cellular Phone", Dec. 2001, IEEE, vol. 48, No. 6, pp. 1238-1247.
Hui, et al."Careless Printed-Circuit Board Transformers for Signal and Energy Transfer", Electronics Letters, May 1998, vol. 34, No. 11, pp. 1052-1054.
Hui, et al. "Optimal Operation of Careless PCB Transformer-Isolated Gate Drive Circuits with Wide Switching Frequency Range", May 1999, IEEE Transactions of Power Electronics, vol. 14, No. 3, pp. 506-514.
Tang, et al. "Characterization of Careless Printed Circuit Board (PCB) Transformers", Nov. 2000, IEEE Transactions of Power Electronics, vol. 15, No. 6, pp. 1275-1282.
Tang, et al. "Careless Printed Circuit Board (PCB) Transformers with Multiple Secondary Windings for Complementary Gate Drive Circuits", May 1999, IEEE Transactions of Power Electronics, vol. 14, No. 3, pp. 431-437.
Tang, et al."Careless Printed Circuit Board (PCB) Transformers with High Power Density and High Efficiency", May 2000, Electronics Letters, vol. 36, No. 11, pp. 943-944.
Borenstein, "Man Tries Wirelessly Boosting Batteries'", Nov. 2006, USA Today, http://www.usatoday.com/tech/wireless/data/2006-11-16-wireless-recharging_x.htm, 5 pages.
Murph, "WildCharger Charges Your Gadgetry Sans Wires", Dec. 2006, Misc. Gadgets, 2 pages.
Gizmo Watch, "Pitstop: A Table Top Recharging Solution by Belkin", http://www.gizmowatch.com/entry/pitstop-a-table-top-recharging-solution-by-belkin, Dec. 2006, 5 pages.
Unknown Author, "Cutting the Cord", Apr. 2007, The Economist, 1 page.
Bishop, "Microsoft Surface Brings Computing to the Table", May 2007, http://seattlepi.nwsource.com/business/317737 msftdevic30.html, 7 pages.
Wildcharge, "The Wire-Free Power Revolution is Only Days Away, and WildCharge, Inc. Is Leading the Charge", Sep. 2007, 3 pages.
Economist.com Science Technology Quarterly, "Wireless Charging", http://www.economist.com/science/tq/PrinterFnendly.cfm?story_id=13174387, Apr. 15, 2009, 4 pages.
United States Patent and Trademark Office, Office Action for U.S. Appl. No. 13/708,548, dated Nov. 20, 2013, 5 pages.
United States Patent and Trademark Office, Office Action for U.S. Appl. No. 13/115,811, dated Sep. 23, 2013, 17 pages.
United States Patent and Trademark Office, Office Action for U.S. Appl. No. 13/108,584, dated Sep. 13, 2013, 16 pages.
United States Patent and Trademark Office, Office Action for U.S. Appl. No. 13/158,134 dated Jan. 22, 2014, 43 pages.
United States Patent and Trademark Office, Office Action for U.S. Appl. No. 13/708,827 dated Feb. 5, 2014, 28 pages.
United States Patent and Trademark Office, Office Action for U.S. Appl. No. 13/708,520, dated Feb. 5, 2014, 8 pages.
United States Patent and Trademark Office, Office Action for U.S. Appl. No. 13/115,811, dated Mar. 4, 2014, 15 pages.
United States Patent and Trademark Office, Office Action for U.S. Appl. No. 13/709,983, dated Feb. 27, 2014, 10 pages.
United States Patent and Trademark Office, Office Action for U.S. Appl. No. 13/710,062, dated Feb. 27, 2014, 9 pages.
United States Patent and Trademark Office, Office Action for U.S. Appl. No. 13/710,017, dated Feb. 27, 2014, 11 pages.
Unknown Author, System Description Wireless Power Transfer, vol. 1: Low Power Part 1: Interface Definition, Version 1.0, Jul. 2010, 83 pages.
The Patent Office of the People's Republic of China, 2nd Office Action for Chinese Patent Application No. 200880023854.4, dated Apr. 15, 2013, 4 pages.

(56) References Cited

OTHER PUBLICATIONS

United States Patent and Trademark Office, Office Action for U.S. Appl. No. 13/708,838, dated Mar. 14, 2014, 30 pages.
International Searching Authority at the U.S. Patent and Trademark Office, International Search Report and Written Opinion for International Patent Application No. PCT/US2013/069270, dated Apr. 4, 2014, 9 pages.
International Search Report dated Jun. 14, 2013, International Application No. PCT/US2013/033352 filed Mar. 21, 2013, 3 pages.
International Searching Authority, International Search Report and Written Opinion for PCT/US2012/021729, dated Aug. 31, 2012, 9 pages.
Unknown Author, System Description Wireless Power Transfer, vol. I: Low Power Part 1: Interface Definition, Version 1.0, Jul. 2010, 83 pages.
European Search Report and Search Opinion in connection with Europe Application 08747863.2 (European National Stage application of PCT/US2008/063084) dated Apr. 2, 2013, 7 pages.
Office Action in connection with Chinese Application 200880023854.4 (Chinese National Stage application of PCT/US2008/063084) dated Aug. 28, 2012, 18 pages.
Office Action in connection with U.S. Appl. No. 13/709,937 dated Sep. 12, 2013, 7 pages.
Office Action in connection with U.S. Appl. No. 12/769,586 dated Dec. 13, 2012, 19 pages.
Office Action in connection with U.S. Appl. No. 13/708,827 dated Jun. 26, 2013, 22 pages.
Office Action in connection with U.S. Appl. No. 13/708,838 dated Jun. 24, 2013, 27 pages.
PCT International Search Report in connection with PCT Application No. PCT/US2011/040062 dated Feb. 17, 2012, 9 pages.
Office Action in connection with U.S. Appl. No. 13/708,548 dated Jun. 7, 2013, 5 pages.
Office Action in connection with U.S. Appl. No. 13/115,811 dated Mar. 28, 2013, 13 pages.
Office Action in connection with U.S. Appl. No. 13/708,520 dated May 24, 2013, 7 pages.
Office Action in connection with U.S. Appl. No. 13/158,134 dated Jun. 12, 2013, 15 pages.
Office Action in connection with U.S. Appl. No. 13/709,983 dated Jun. 7, 2013, 7 pages.
Office Action in connection with U.S. Appl. No. 13/710,017 dated Jun. 11, 2013, 7 pages.
Office Action in connection with U.S. Appl. No. 13/710,062 dated Jun. 7, 2013, 7 pages.
Office Action in connection with Japanese Application JP/2010-507666 (Japanese National Stage application of PCT/US2008/063084) dated Dec. 3, 2012, 4 pages.
International Search Report and Written Opinion of the International Searching Authority, Korean Intellectual Property Office, in re International Application No. PCT/US2010/032845 dated Dec. 13, 2010, 10 pages.
WildCharge Life unplugged!. http://www.wildcharg.com/4/17/2009, 2 pages.
Powermat "the Future of Wireless Power has Arrived", http://www.pwrmal.com, Apr. 15, 2009, 2 pages.
ECoupled Wireless Power Technology Fulton Innovation, http://www.ecoupled.com, Apr. 15, 2009, 5 pages.
Qualcomm Products and Services—Wirelss Airlink Technologies, http://www.qualcomm.com/products_services/airlinks, Apr. 15, 2009, 4 pages.
Office Action in connection with U.S. Appl. No. 11/757,067 dated Jan. 26, 2009, 14 pages.
Office Action in connection with U.S. Appl. No. 11/757,067 dated Oct. 19, 2009, 14 pages.
Office Action in connection with U.S. Appl. No. 11/757,067 dated May 10, 2010, 15 pages.
Office Action in connection with U.S. Appl. No. 13/113,977 dated Nov. 9, 2012, 9 pages.
Office Action in connection with U.S. Appl. No. 11/669,113 dated Oct. 29, 2008, 11 pages.
Office Action in connection with U.S. Appl. No. 11/669,113 dated Aug. 25, 2009, 17 pages.
Office Action in connection with U.S. Appl. No. 11/669,113 dated May 13, 2010, 20 pages.
Office Action in connection with U.S. Appl. No. 12/116,876 dated May 2, 2011, 5 pages.
Office Action in connection with U.S. Appl. No. 13/442,698 dated Sep. 13, 2012, 6 pages.
PCT International Search Report in connection with PCT application No. PCT/US2008/63084, 8 pages, dated Aug. 8, 2008.
PCT International Search Report in connection with PCT application No. PCT/US2007/61406, 8 pages, dated Feb. 14, 2008.
United States Patent and Trademark Office, Office Action for U.S. Appl. No. 13/708,584, dated Sep. 13, 2013, 16 pages.
Japanese Patent Office, Office Action for Japanese Patent Application No. 2010-507666, dated Mar. 9, 2015, 8 pages.
Japanese Patent Office, Office Action for Japanese Patent Application No. 2014-104181, dated Mar. 23, 2015, 14 pages.
United States Patent and Trademark Office, Office Action for U.S. Appl. No. 13/830,161, dated Apr. 16, 2015, 24 pages.
Japanese Patent Office, Examiner's Reconsideration Report for Japanese Patent Application No. 2010-507666, dated Jul. 17, 2014, 1 page.
United States Patent and Trademark Office, Office Action for U.S. Appl. No. 13/829,346, dated Feb. 12, 2015, 10 pages.
United States Patent and Trademark Office, Office Action for U.S. Appl. No. 13/829,186, dated Jan. 23, 2015, 12 pages.
United States Patent and Trademark Office, Office Action for U.S. Appl. No. 13/828,933, dated Feb. 5, 2015, 11 pages.
United States Patent and Trademark Office, Office Action for U.S. Appl. No. 13/352,096, dated Aug. 18, 2014, 14 pages.
United States Patent and Trademark Office, Office Action for U.S. Appl. No. 13/708,584, dated Jan. 23, 2015, 25 pages.
United States Patent and Trademark Office, Office Action for U.S. Appl. No. 12/769,586, dated Jun. 2, 2014, 23 pages.
United States Patent and Trademark Office, Office Action for U.S. Appl. No. 13/708,520, dated Aug. 14, 2014, 9 pages.
United States Patent and Trademark Office, Office Action for U.S. Appl. No. 13/115,811, dated Aug. 20, 2014, 20 pages.
United States Patent and Trademark Office, Office Action for U.S. Appl. No. 14/135,082, dated Dec. 5, 2014, 14 pages.
United States Patent and Trademark Office, Office Action for U.S. Appl. No. 13/708,520, dated Mar. 11, 2015, 10 pages.
International Searching Authority at the U.S. Patent and Trademark Office, International Search Report and Written Opinion for PCT International Patent Application No. PCT/US2013/078534, dated May 13, 2014, 11 pages.
International Searching Authority and Written Opinion From the U.S. Patent and Trademark Office, International Search Report and Written Opinion for PCT International Application No. PCT/US2013/069270, dated Apr. 4, 2014, 9 pages.
Hui, "A New Generation of Universal Contactless Battery Charging Platform for Portable Consumer Electronic Equipment", IEEE Transactions on Power Electronics, vol. 20, No. 3, May 2005, pp. 620-627, 8 pages.
Tang, et al., "Evaluation of the Shielding Effects on Printed-Circuit-Board Transformers Using Ferrite Plates and Copper Sheets", IEEE Transactions on Power Electronics, vol. 17, No. 6, Nov. 2002, pp. 1080-1088, 9 pages.
Liu, et al., "An Analysis of a Double-Layer Electromagnetic Shield for a Universal Contactless Battery Charging Platform", Department of Electronic Engineering City University of Hong Kong, IEEE, 2005, pp. 1767-1772, 6 pages.
Liu, et al., Equivalent Circuit Modeling of a Multilayer Planar Winding Array Structure for Use in a Universal Contactless Battery Charging Platform, IEEE Transactions on Power Electronics, vol. 22, No. 1, Jan. 2007, pp. 21-29, 9 pages.
Liu, et al., "Simulation Study and Experimental Verification of a Universal Contactless Battery Charging Platform with Localized Charging Features", IEEE Transactions on Power Electronics, vol. 22, No. 6, Nov. 2007, pp. 2202-2210, 9 pages.

(56) References Cited

OTHER PUBLICATIONS

Liu, et al., "Optimal Design of a Hybrid Winding Structure for Planar Contaclless Battery Charging Platform", IEEE Transactions on Power Electronics, vol. 23, No. 1, Jan. 2008, pp. 455-463, 9 pages.

Karalis, et al., "Efficient Wirelss Non-Radiative Mid-Range Energy Transfer", ScienceDirect, Annals of Physics 323, 2008, pp. 34-48, 15 pages.

Su, et al., "Mutual Inductance Calculation of Movable Planar Coils on Parallel Surfaces", IEEE Transactions on Power Electronics, vol. 24, No. 4, Apr. 2009, pp. 1115-1124, 10 pages.

Hui, et al., "Careless Printed Circuit Board (PCB) Transformers—Fundamental Characteristics and Application Potential", IEEE Circuits and Systems, Vo. 11, No. 3, Third Quarter 2000, pp. 1-48, 48 pages.

Sekitani, et al., "A Large-Area Flexible Wireless Power Transmission Sheet Using Printed Plastic MEMS Switches and Organic Field-Effect Transistors", IEEE, Quantum-Phase Electronics Center, School of Engineering, The University of Tokyo, 2006, 4 pages.

Choi, et al., "A New Contactless Battery Charger for Portable Telecommunication/Compuing Electronics", IEEE, School of Electronic and Electrical Engineering, Kyungpook National University, Taegu, Korea, 2011, pp. 58-59 2 pages.

Hui, et al., "Careless Printed Circuit Board (PCB) Transformers for Power MOSFET/IGBT Gate Drive Circuits", IEEE Transactions on Power Electronics, vol. 14, No. 3, May 1999, pp. 422-430, 9 pages.

Tang, et al., "Careless Planar Printed-Circuit-Board (PCB) Transformers—A Fundamental Concept for Signal and Energy Transfer", IEEE Transactions on Power Electronics, vol. 15, No. 5, Sep. 2000, pp. 931-941, 11 pages.

Hatanaka. et al.. "Power Transmission of a Desk with Cord-Free Power Supply". IEEE Transactions on Magnetics. vol. 38. No. 5, Sep. 2002, pp. 3329-3331, 3 pages.

Fernandez, et al., "Design Issues of a Core-less Transformer for a Contact-less Application", IEEE, Universidad Politecnica de Madrid, 2002, pp. 339-345, 7 pages.

Hui, et al., "A New Generation of Universal Contactless Battery Charging Platform for Portable Consumer Electronic Equipment", IEEE Transactions on Power Electronics, vol. 20, No. 3, May 2005, pp. 620-627, 8 pages.

Liu, et al., "Optimal Design of a Hybrid Winding Structure for Planar Contactless Battery Charging Platform", IEEE, Department of Electronic Engineering, City University of Hong Kong, 2006, pp. 2568-2575, 8 pages.

Topfer, et al., "Multi-Pole Magnetization of NdFeB Sintered Magnets and Thick Films for Magnetic Micro-Actuators", ScienceDirect, Sensor and Actuators, 2004, pp. 257-263, 7 pages.

Topfer, et al., "Multi-Pole Magnetization of NdFeB Magnets for Magnetic Micro-Actuators and Its Characterization with a Magnetic Field Mapping Device", ScienceDirect, Journal of Magnetism and Magnetic Materials, 2004, 124-129, 6 pages.

Sakamoto, et al., "A Novel High Power Converter for Non-Contact Charging with Magnetic Coupling", IEEE Transactions on Magnetics, vol. 30, No. 6, Nov. 1994, pp. 4755-4757, 3 pages.

Hui, et al., "Some Electromagnetic Aspects of Careless PCB Transformers", IEEE Transactions on Power Electronics, vol. 15, No. 4, Jul. 2000, pp. 805-810, 6 pages.

Waffenschmidt, et al., "Limitation of Inductive Power Transfer for Consumer Applications", 13th European Conference on Power Electronics and Applications, Barcelona, 2009. EPE '09. pp. 1-10, 10 pages.

Stokes, "Palm Strikes Back with new OS, Pre Handset at CES, http://arstechnica.com/news.ars/post/20090101-palm-laundhes -new-handset-pre-operating", Jan. 8, 2009, 6 pages.

Sullivan, Visteon to Sell Wireless Gadget Charger, "Wire-Free Technology will Lets Consumers Dump Cords and Chargers", Red Herring, Dec. 29, 2006, 2 pages.

Kim, "Wireless Charger for New Palm Phone", San Francisco Chronicle and SFGate.com, May 11, 2009, 2 pages.

Compeau, Red Zen Marketing, "Could This be the Mojo Behind the Palm Pre's Touchstone Charger?", http://redzenmarketing.posterous.com/could-this-be-the-mojo-behind-the-palm-pres-t, Jun. 5, 2009, 3 pages.

Fulton Innovation LLC, "The Big Story for CES 2007: The Public Debut of eCoupled Intelligent Wireless Power", ecoupled, Dec. 27, 2006, 2 pages.

Miller, "Palm May Make Pre Scarce", The San Jose Mercury News, Apr. 29, 2009, 1 page.

Murakami et al., "Consideration on Cordless Power Station Contactless Power Transmission System", IEEE Transactions on Magnets, vol. 32, No. 5, Sep. 1996, 3 pages.

Epson Air Trans "Wireless Power Transfer", http://www.2k1.co.uk/components/epson_airtrans.asp, Dec. 8, 2008, 2 pages.

Choi, et al., "A New Contactless Battery Charger for Portable Telecommunication/Compuing Electronics", IEEE, School of Electronic and Electrical Engineering, Kyungpook National University, Taegu, Korea, 2001, pp. 58-59 2 pages.

PCT International Preliminary Report on Patentability dated Nov. 10, 2011 in re International Application No. PCT, US2010/032845, 7 pages.

* cited by examiner

POWERING OR CHARGING SMALL-VOLUME OR SMALL-SURFACE RECEIVERS OR DEVICES

CLAIM OF PRIORITY AND CROSS-REFERENCE TO RELATED APPLICATIONS

This application is a continuation of U.S. patent application Ser. No. 15/830,411, titled, "SYSTEM AND METHOD FOR POWERING OR CHARGING SMALL-VOLUME or SMALL-SURFACE RECEIVERS OR DEVICES, filed Dec. 4, 2017, which is a continuation of U.S. patent application Ser. No. 14/252,627, titled "SYSTEM AND METHOD FOR POWERING OR CHARGING RECEIVERS OR DEVICES HAVING SMALL SURFACE AREAS OR VOLUMES," filed Apr. 14, 2014, which claims priority to U.S. Provisional Patent Application No. 61/811,638, titled "SYSTEM AND METHOD FOR POWERING OR CHARGING ONE OR MULTIPLE RECEIVERS OR DEVICES HAVING SMALL SURFACE AREAS OR VOLUMES" filed Apr. 12, 2013; and is related to U.S. Patent Publication No. 20130285604 (U.S. patent application Ser. No. 13/828,789), titled "SYSTEMS AND METHODS FOR WIRELESS POWER TRANSFER" filed Mar. 14, 2013; and U.S. Patent Publication No. 20120235636 (U.S. patent application Ser. No. 13/352,096), titled "SYSTEMS AND METHODS FOR PROVIDING POSITIONING FREEDOM, AND SUPPORT OF DIFFERENT VOLTAGES, PROTOCOLS, AND POWER LEVELS IN A WIRELESS POWER SYSTEM", filed Jan. 17, 2012, which claims the benefit of priority to U.S. Provisional Patent Application No. 61/433,883, titled "SYSTEM AND METHOD FOR MODULATING THE PHASE AND AMPLITUDE OF AN ELECTROMAGNETIC WAVE IN MULTIPLE DIMENSIONS", filed Jan. 18, 2011; U.S. Provisional Patent Application No. 61/478,020, titled "SYSTEM AND METHOD FOR MODULATING THE PHASE AND AMPLITUDE OF AN ELECTROMAGNETIC WAVE IN MULTIPLE DIMENSIONS", filed Apr. 21, 2011; and U.S. Provisional Patent Application No. 61/546,316, titled "SYSTEMS AND METHODS FOR PROVIDING POSITIONING FREEDOM, AND SUPPORT OF DIFFERENT VOLTAGES, PROTOCOLS, AND POWER LEVELS IN A WIRELESS POWER SYSTEM", filed Oct. 12, 2011; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Field of Invention

Embodiments of the invention are generally related to systems and methods for enabling transfer of power, from a wireless charger or power supply, to one or more receivers placed on or near the wireless charger or power supply, including powering or charging one or multiple receivers or devices having small surface areas or volumes.

Related Art

Wireless technologies for powering and charging mobile and other electronic or electric devices, batteries and vehicles have been developed. Such systems generally use a wireless power charger or transmitter, in combination with a wireless power receiver, to provide a means for transfer of power. In some systems, the charger and receiver coil parts of the system are aligned and of comparable size. However, in some applications, it would be preferable to use receiver coils or antennas that have smaller areas or volumes. These are the general areas that embodiments of the invention are intended to address.

SUMMARY

Described herein are systems and methods for enabling transfer of power, from a wireless charger or power supply, to one or more receivers placed on or near the wireless charger or power supply, including powering or charging one or multiple receivers or devices having small surface areas or volumes. In accordance with an embodiment, a receiver coil can be generally shaped as a blade or thin solenoid, which receives power inductively, which is then used to power or charge one or more electronic devices. Applications include inductive or magnetic charging and power, and particularly usage in mobile, electronic, electric, lighting, or other devices, batteries, power tools, kitchen, industrial, medical or dental, or military applications, vehicles, robots, trains, and other usages.

Thus, for example, provided is a wireless power receiver for powering or charging an electric or electronic device or battery or a mobile electronic system such as a vehicle or robot. The receiver may consist of or consist essentially of a receiver coil of a blade or thin solenoid shape/geometry that includes a larger surface in a first dimension and a smaller surface in a second and/or third dimension, which receives power inductively from a wireless charger. The charger may be a source of an alternating magnetic field to charge or power one or multiple wireless power receivers or devices having small surface areas or volumes. The receiver coil has the smaller surface facing a charging surface of the charger.

Additional magnetic or ferrite material or layers may be added to or otherwise integrated with the top and/or bottom of the receiver coil, to aid in the guidance of flux generated in the receiver coil.

The receiver coil may include a flux guide material such as ferrite with permeability greater than 1. When the receiver is placed on the charger at an axis perpendicular to or at an angle sufficient to receive a substantially perpendicular flux from the charger, the axis may be perpendicular to a tangent plane associated with the surface of the charger.

One or more electronic devices may be provided, e.g., in the form of one of the following: batteries, cell phones, smart phones, cordless phones, communication devices, heads-up displays, wearable computer with head mounted display, 3-d TV glasses, wearable electronic glasses, wearable computer or communication devices, communication or display watches, pagers, personal data assistants, portable media players, global positioning (GPS) devices, powered headphones or noise cancelling headphones, Bluetooth headsets and other devices, shavers, watches, tooth brushes, calculators, cameras, optical scopes, infrared viewers, computers, laptops, tablets, netbooks, keyboards, computer mice, book readers or email devices, pagers, computer monitors, televisions, music or movie players and recorders, storage devices, radios, clocks, speakers, gaming devices, game controllers, toys, remote controllers, power tools, cash register, delivery or other type of scanners, construction tools, office equipment, robots including vacuum cleaning robots, floor washing robots, pool cleaning robots, gutter cleaning robots or robots used in hospital, clean room, military or industrial environments, industrial tools, mobile vacuum cleaners, medical or dental tools, medical stretcher batteries, military equipment or tools, kitchen appliances, mixers, cookers, can openers, food or beverage heaters or coolers such as electrically powered beverage mugs, massagers, adult toys, lights or light fixtures, signs or displays, or advertising applications, electronic magazines or newspapers or magazines or newspapers containing an electronic and/or display part, printers, fax machines, scanners, electric vehicles, electric golf carts, buses, trains, motorcycles or bicycles, personal mobility (e.g., Segway type) devices, trains or other vehicles or mobile transportation machines, and other battery or electrically powered devices or products or a product that is a combination of the products listed above.

The receiver coil may include a flux guide material such as ferrite with permeability greater than 1, with an axis perpendicular to or at an angle sufficient to receive a substantially perpendicular flux from the charger. The axis may be perpendicular to a tangent plane associated with the surface of the charger.

The charger and the receiver to be powered or charged may communicate to determine optimum powering or charging.

When the invention is used in connection with an electric or electronic device or battery or a mobile electronic system such as a vehicle or robot to be charged or powered, the electric or electronic device or battery or a mobile electronic system such as a vehicle or robot may communicate user data with the charger or a system that the charger is integrated into.

The receiver or the electronic or electric device can be configured to detect the orientation or front-back placement of the device during charging and perform additional contextually-aware functions.

As another example, provided is a wireless charger including a charger coil designed to provide a substantially uniform magnetic field over an area larger than 50% of the charger surface and to provide power to one or more wireless power receivers including a blade or thin solenoid shape coil that includes a larger surface in a first dimension and a smaller surface in a second and/or third dimension.

The charger may include a charger coil atop a magnetic flux guide or shielding material or layer that extends beyond the edges of the charger coil. The charger may include at least two separate coil structures provided on top of a magnetic layer to provide two or more different sections with different operating principles or protocols or driving and/or communication sections, for use in powering or charging receivers including a blade or thin solenoid shape coil and a flat or curved coil with the plane of the coil being substantially parallel to the surface of the charger.

The charger and the receiver to be powered or charged may communicate to determine optimum powering or charging.

The charger can be configured to detect the orientation or front-back placement of the electric or electronic device during charging or powering and perform additional contextually-aware functions.

The charger may be incorporated into another electric or electronics device, table, desk chair, armrest, TV stand or mount or furniture or vehicle or airplane or marine vehicle or boat or objects such as a table, desk, chair, counter-top, shelving or check out or cashier counters, kiosk, car seat, armrest, car console, car door, netting, cup holder, dashboard, glove box, etc., airplane tray, computer, laptop, netbook, tablet, phone, display, TV, magnetic, optical or semiconductor storage or playback device such as hard drive, solid state storage drive, optical players, etc., cable or game console, computer pads, toys, clothing, bags, case or backpack, belt or holster, etc., industrial, medical, dental, military equipment or kitchen counter, area, devices and appliances, phones, cameras, radios, stereo systems, or speakers.

DETAILED DESCRIPTION

Figure 1:
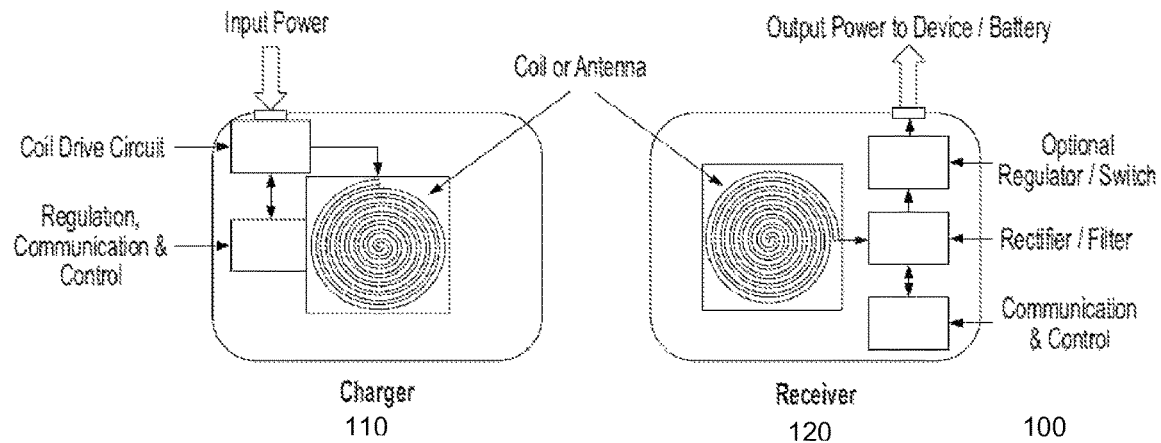
FIG. 1 illustrates a system for wireless powering or charging of devices, in accordance with an embodiment.

With the proliferation of electrical and electronic devices and vehicles (which are considered examples of devices herein), simple and universal methods of providing power and or charging of these devices is becoming increasingly important.

In accordance with various embodiments, the term device, product, or battery is used herein to include any electrical, electronic, mobile, lighting, or other product, batteries, power tools, cleaning, industrial, kitchen, lighting, military, medical, dental or specialized products and vehicles, automobiles, personal mobility (e.g., Segway type) devices, buses, or movable machines such as robots or other mobile machines or other devices whereby the product, part, or component is powered by electricity or an internal or external battery and/or can be powered or charged externally or internally by a generator or solar cell, fuel cell, hand or other mechanical crank or alike.

In accordance with an embodiment, a product or device can also include an attachable or integral skin, case, cover, battery door or attachable or add-on or dongle type of receiver component, to enable the user to power or charge the product, battery, or device.

Induction generally refers to generation of electromotive force (EMF) or voltage across a closed electrical path in response to a changing magnetic flux through any surface bounded by that path. In literature, sometimes magnetic induction is defined as if it is limited to tightly-coupled cases whereby the charger and receiver coils are of similar sizes or the gap between them is small. Magnetic resonance is a term that has been used recently for inductive power transfer where the charger and receiver may be far apart or the transmitter and receiver coils are of different size. The term loosely-coupled wireless charging has also been used for these systems. Since magnetic resonance or loosely-coupled wireless charging is in general a form of induction, as used herein in accordance with various embodiments the term induction is used for any of these systems (including inductive or tightly-coupled wireless power transfer, magnetic resonant or loosely-coupled wireless power transfer and hybrid systems), and induction and magnetic resonance are sometimes used interchangeably to indicate that the method of power transfer can be in either domain or a combination thereof.

In accordance with various embodiments, an inductive power transmitter employs a magnetic induction coil(s) transmitting energy to a receiving coil(s) in or on a device or product, case, battery door, or attachable or add-on component including attachments such as a dongle or a battery inside or outside of device or attached to device through a connector and/or a wire, or stand-alone placed near or on the power transmitter platform. The receiver can be an otherwise incomplete device that receives power wirelessly and is intended for installation or attachment in or on the final product, battery or device to be powered or charged, or the receiver can be a complete device intended for connection to a device, product or battery directly by a wire or wirelessly. As used herein, the term wireless power, charger, transmitter or inductive or magnetic resonance power and charger are used interchangeably.

In accordance with an embodiment, the wireless charger can include a flat or curved surface, or an open or enclosed volume or part that can provide energy wirelessly to a receiver. It can also be constructed of flexible materials and/or coils or even plastic electronics to enable mechanical flexibility and bending or folding to save space or for conformity to non-flat surfaces.

In accordance with an embodiment, the wireless charger can be directly powered by an AC power input, DC power, or other power source such as a car, motorcycle, truck or other vehicle or airplane or boat or ship power outlet, or vehicle, boat, ship or airplane itself, primary (non-rechargeable) or rechargeable battery, solar cell, fuel cell, mechanical (e.g., hand crank, wind, or water source), nuclear source, or other wireless charger or power supply or a combination thereof. In addition, the wireless charger can be powered by a part such as a rechargeable battery which is itself in turn recharged by another source such as an AC or DC power source, vehicle, boat or ship or airplane outlet or vehicle, boat or ship or airplane itself, solar cell, fuel cell, mechanical (e.g., hand crank, wind, or water source) or nuclear source, or a combination thereof.

In accordance with various embodiments, in applications where the wireless charger is powered by a rechargeable source such as a battery, the battery can also be itself in turn inductively charged by another wireless charger. The wireless charger can be a stand-alone part, device, or product, or can be incorporated into another electric or electronics device, table, desk chair, armrest, TV stand or mount or furniture or vehicle or airplane or marine vehicle or boat or objects such as a table, desk, chair, counter-top, shelving or check out or cashier counters, kiosk, car seat, armrest, car console, car door, netting, cup holder, dashboard, glove box, etc., airplane tray, computer, laptop, netbook, tablet, phone, display, TV, magnetic, optical or semiconductor storage or playback device such as hard drive, solid state storage drive, optical players, etc., cable or game console, computer pads, toys, clothing, bags, case or backpack, belt or holster, etc., industrial, medical, dental, military equipment or kitchen counter, area, devices and appliances, phones, cameras, radios, stereo systems, speakers, etc. The wireless charger can also have other functions built in, or be constructed such that it is modular and additional capabilities or functions can be added as needed.

In accordance with various embodiments, some of these capabilities or functions include an ability to provide higher power, charge more devices, exchange the top surface or exterior box or cosmetics, operate by internal power as described above through use of a battery and/or renewable source such as solar cells, communicate and/or store data from a device, provide communication between the device and other devices or the charger and/or a network, etc. An example is a basic wireless charger that has the ability to be extended to include a rechargeable battery pack to enable operation without external power. Examples of products or devices powered or charged by the induction transmitter and receiver include but are not limited to batteries, cell phones, smart phones, cordless phones, communication devices, heads-up displays, wearable computer with head mounted display, 3-d TV glasses, wearable electronic glasses, wearable computer or communication devices, communication or display watches, pagers, personal data assistants, portable media players, global positioning (GPS) devices, powered headphones or noise cancelling headphones, Bluetooth headsets and other devices, shavers, watches, tooth brushes, calculators, cameras, optical scopes, infrared viewers, computers, laptops, tablets, netbooks, keyboards, computer mice, book readers or email devices, pagers, computer monitors, televisions, music or movie players and recorders, storage devices, radios, clocks, speakers, gaming devices, game controllers, toys, remote controllers, power tools, cash register, delivery or other type of scanners, construction tools, office equipment, robots including vacuum cleaning robots, floor washing robots, pool cleaning robots, gutter cleaning robots or robots used in hospital, clean room, military or industrial environments, industrial tools, mobile vacuum cleaners, medical or dental tools, medical stretcher batteries, military equipment or tools, kitchen appliances, mixers, cookers, can openers, food or beverage heaters or coolers such as electrically powered beverage mugs, massagers, adult toys, lights or light fixtures, signs or displays, or advertising applications, electronic magazines or newspapers or magazines or newspapers containing an electronic and/or display part, printers, fax machines, scanners, electric vehicles, electric golf carts, buses, trains, motorcycles or bicycles, personal mobility (e.g., Segway type) devices, trains or other vehicles or mobile transportation machines, and other battery or electrically powered devices or products or a product that is a combination of the products listed above.

In accordance with an embodiment, the receiver and/or the charger can be incorporated into a bag, carrier, skin, cover, clothing, case, packaging, product packaging or box, crate, box, display case or rack, table, bottle or device etc. to enable some function inside the bag, carrier, skin, clothing, case, packaging, product packaging or box, crate, box, display case or rack, table, bottle (such as, e.g., causing a display case or packaging to display promotional information or instructions, or to illuminate) and/or to use the bag, carrier, skin, clothing, case, packaging, product packaging or box, crate, box, stand or connector, display case or rack, table, bottle, etc., to power or charge another device or component somewhere on or nearby.

In accordance with various embodiments, the product or device does not necessarily have to be portable and/or contain a battery to take advantage of induction or wireless power transfer. For example, a lighting fixture or a computer monitor that is typically powered by an AC outlet or a DC power supply can be placed on a table top and receive power wirelessly. The wireless receiver can be a flat or curved surface or part that can receive energy wirelessly from a charger. The receiver and/or the charger can also be constructed of flexible materials and/or coils or even plastic electronics to enable mechanical flexibility and bending or folding to save space or for conformity to non-flat surfaces.

In accordance with various embodiments, many of these devices contain internal batteries, and the device may or may not be operating during receipt of power. Depending on the degree of charge status of the battery, or its presence and the system design, the applied power may provide power to the device, charge its battery or a combination of the above. The terms charging and/or power are used interchangeably herein to indicate that the received power can be used for either of these cases or a combination thereof. In accordance with various embodiments, unless specifically described, these terms are therefore used interchangeably. Also, unless specifically described herein, in accordance with various embodiments, the terms charger, power supply, and transmitter are used interchangeably.

FIG. 1 illustrates a system for wireless powering or charging of devices in accordance with an embodiment. As shown in FIG. 1, in accordance with an embodiment, a wireless charger or power system 100 comprises a first charger or transmitter part 110, and a receiver 120 connected to a mobile or stationary device, vehicle or battery or its charging or power circuit to provide electric power to power or charge the mobile or stationary device, vehicle or its battery.

FIG. 1 shows an example where one charger or power transmitter is charging or powering one receiver. However, in a more general case, the transmitter may comprise one or more transmitters or chargers operating at different power levels and/or using different protocols to power one or more receivers operating at different power levels, voltages and/or protocols.

Figure 2:
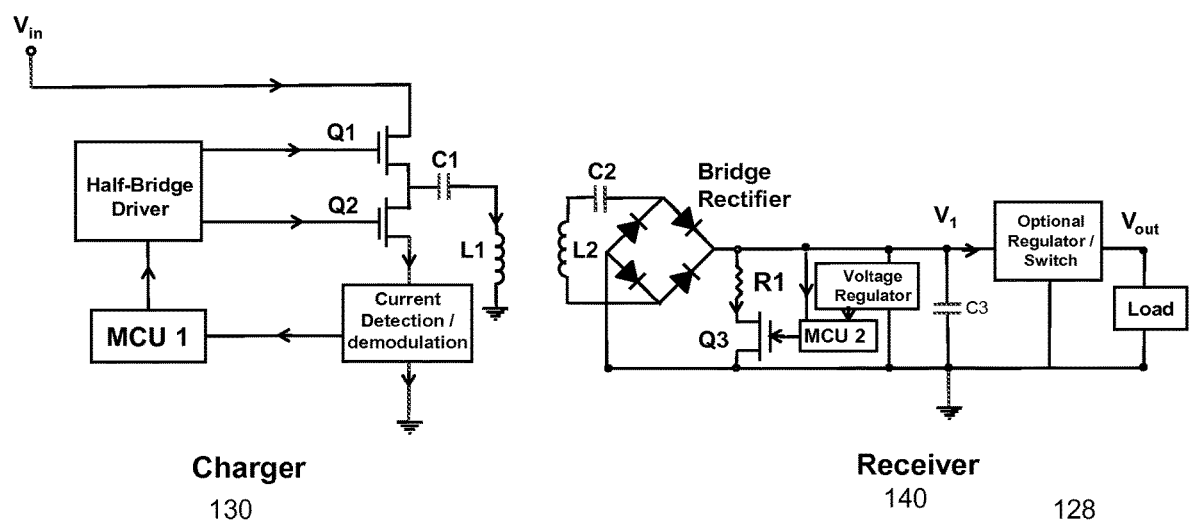
FIG. 2 illustrates another view of a wireless charger system, in accordance with an embodiment.

FIG. 2 illustrates a more detailed view of a wireless charger system 128, in accordance with an embodiment, with a resonant converter geometry, wherein a pair of transistors Q1 and Q2 in the charger 130 (such as FETs, MOSFETs, or other types of switch) are driven by a half-bridge driver IC and the voltage is applied to the coil L1 through one or more capacitors shown as C1. In accordance with an embodiment, the receiver 140 includes a coil and an optional capacitor (for added efficiency) shown as C2 that can be in series or in parallel with the receiver coil L2. The charger and/or receiver coils can also include impedance matching circuits and/or appropriate magnetic material layers behind (on the side opposite to the coil surfaces facing each other) them to increase their inductance and/or to shield the magnetic field leakage to surrounding area. The charger and/or receiver can also include impedance matching circuits to optimize or improve power transfer between the charger and receiver.

In several of the embodiments and figures described herein, the resonant capacitor C2 in the receiver is shown in a series embodiment. This is intended only as a representative illustration, and in accordance with various embodiments this capacitor can be used in series or parallel with the receiver coil. Similarly, the charger is generally shown in accordance with an embodiment where the resonant capacitor is in series with the coil. System implementations with the capacitor C1 in parallel with the charger coil are also possible.

In accordance with an embodiment, the charger can also include a circuit that measures the current through and/or voltage across the charger coil (for example, in FIG. 2, a current sensor is shown as an example). Communication between the receiver and the charger can also be provided through the same coils as used for the power transfer, through modulation of a load in the receiver. Various demodulation methods for detection of the communication signal on the charger current or voltage are available. This demodulation mechanism can be, e.g., an AM or FM receiver (depending on whether amplitude or frequency modulation is employed in the receiver modulator) similar to a radio receiver tuned to the frequency of the communication or a heterodyne detector.

In accordance with an embodiment, the communication and control between the charger and the receiver(s) is conducted over a separate or additional RF or optical or other channels. Optional methods of communication between the charger and receiver can be provided through the same coils as used for transfer of power, through a separate coil, through an RF or optical link, through, e.g., RFID, Bluetooth, WiFi, Wireless USB, NFC, Felica, Zigbee, or Wireless Gigabit (WiGig) or through such protocols as defined by the Wireless Power Consortium (WPC), Alliance for Wireless Power (A4WP) or other protocols or standards, developed for wireless power, or specialized protocols such as Dedicated Short Range Communications (DSRC) for automotive applications, or other communication protocol, or combinations thereof.

In accordance with an embodiment, the microcontroller unit (MCU) in the charger (shown as MCU1 in FIG. 2) is responsible for decoding the communication signal from a detection/demodulation circuit and, depending on the algorithm used, making appropriate adjustments to the charger coil drive circuitry to achieve the desired output voltage, current or power from the receiver output.

Figure 3:
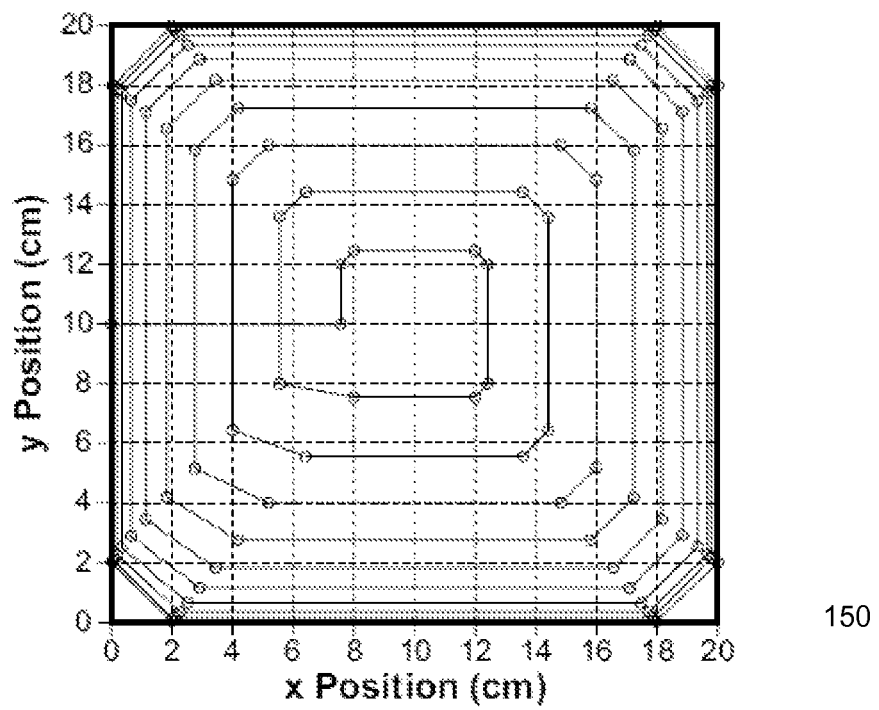
FIG. 3 illustrates an example of a charger coil, in accordance with an embodiment.
Figure 4:
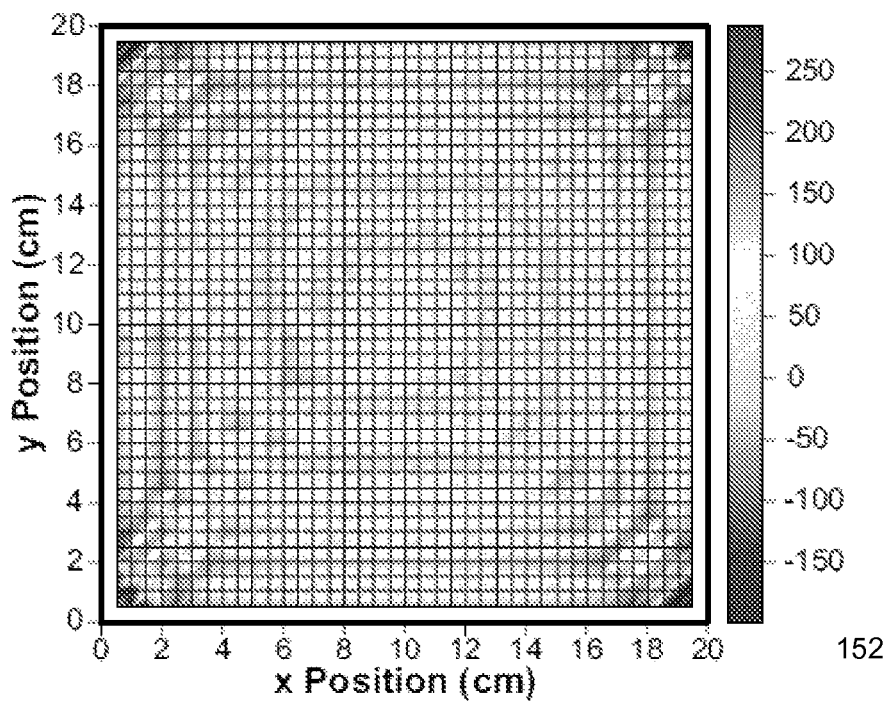
FIG. 4 illustrates a resulting magnetic field, in accordance with an embodiment.

In accordance with various embodiments, it may be preferable for one or more receivers to receive power when placed at a variety of locations or anywhere on or near a wireless charger area. Such an implementation, in general would benefit from a charger and/or receiver design that allows a uniform power transfer over an area or the entire surface of the charger. To provide more uniform power transfer across a coil, in accordance with an embodiment, methods to provide a more uniform magnetic field across a coil can be used. For example, one method for achieving this uses a hybrid coil comprising a combination of a wire and PCB coils (e.g., X. Liu and S. Y. R. Hui, "Optimal design of a hybrid winding structure for planar contactless battery charging platform," IEEE Transactions on Power Electronics, vol. 23, no. 1, pp. 455-463, 2008). In another method, the transmitter coil can be constructed of Litz wire or patterned printed circuit board (PCB) and has a pattern that is very wide between successive turns at the center and is more tightly wound as one gets closer to the edges (e.g., J. J. Casanova, Z. N. Low, J. Lin, and R. Tseng, "Transmitting coil achieving uniform magnetic field distribution for planar wireless power transfer system," in Proceedings of the IEEE Radio and Wireless Symposium, pp. 530-533, January 2009). FIG. 3 shows an example of a coil 150 in accordance with an embodiment, while FIG. 4 shows a resulting magnetic field 152.

In a geometry described in U.S. Patent Publication No. 20080067874, a planar spiral inductor coil is demonstrated, wherein the width of the inductor's trace becomes wider as the trace spirals toward the center of the coil to achieve a more uniform magnetic field allowing more positioning flexibility for a receiver across a transmitter surface.

In yet other embodiments (e.g., F. Sato, et al., IEEE Digest of Intermag 1999, PP. GR09, 1999), the coil can be a meandering type of coil, wherein the wire is stretched along X or Y direction and then folds back and makes a back and forth pattern to cover the surface.

In accordance with an embodiment, the charger can operate continuously, and any appropriate receiver coil placed on or near its surface will bring it to resonance and will begin receiving power. The regulation of power to the output can be performed through a regulation stage and/or tuning of the resonant circuit at the receiver. Advantages of such a system include that multiple receivers with different power needs can be simultaneously powered in this way. The receivers can also have different output voltage characteristics.

In accordance with embodiments described in U.S. patent application Ser. No. 13/352,096, published as U.S. Patent Publication No. 20120235636, which application is herein incorporated by reference, two techniques have been described whereby through appropriate design of the system, a position-independent power transfer system with reduced or no undesirable radiation and high efficiency can be achieved. These geometries use a saturable magnetic layer placed above the charger coil area to shield the charger magnetic layer from the surrounding area.

For example, in accordance with an embodiment, a Magnetic Aperture (MA) receiver includes an appropriate magnet in the receiver that can saturate the shield layer nearby the receiver and allow coupling of power only in that area of the charger, resulting in efficient power coupling with minimal residual electromagnetic emission from nearby areas. In accordance with an embodiment, a Magnetic Coupling (MC) system employs a similar geometry but uses the increase in the resonant electromagnetic field between the charger and receiver coils to self-saturate the layer, and does not require a receiver magnet to operate and achieve similar results. These two techniques are further described in the patent applications referenced above.

Figure 5:
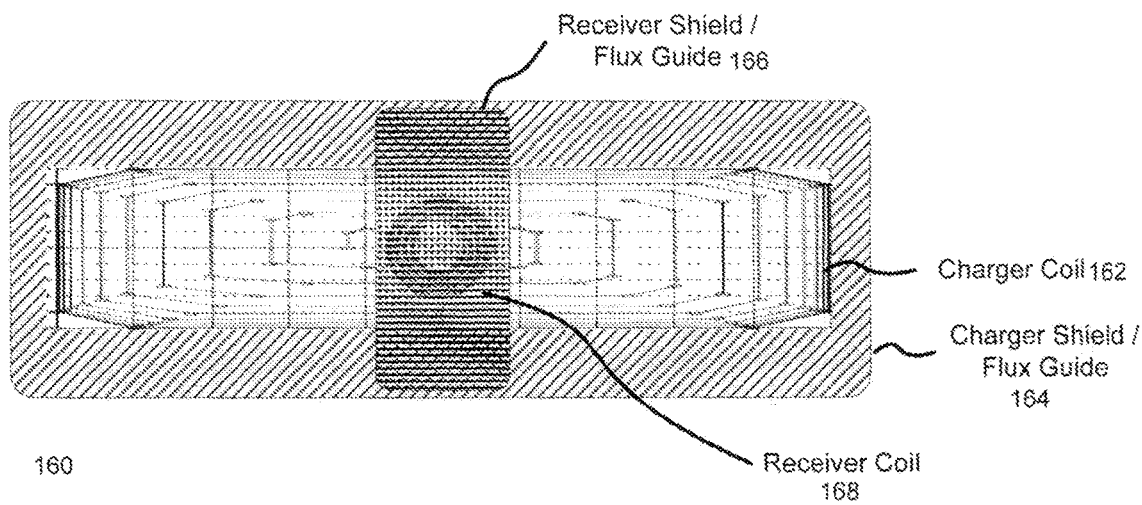
FIG. 5 illustrates a charger geometry, in accordance with an embodiment.
Figure 6:
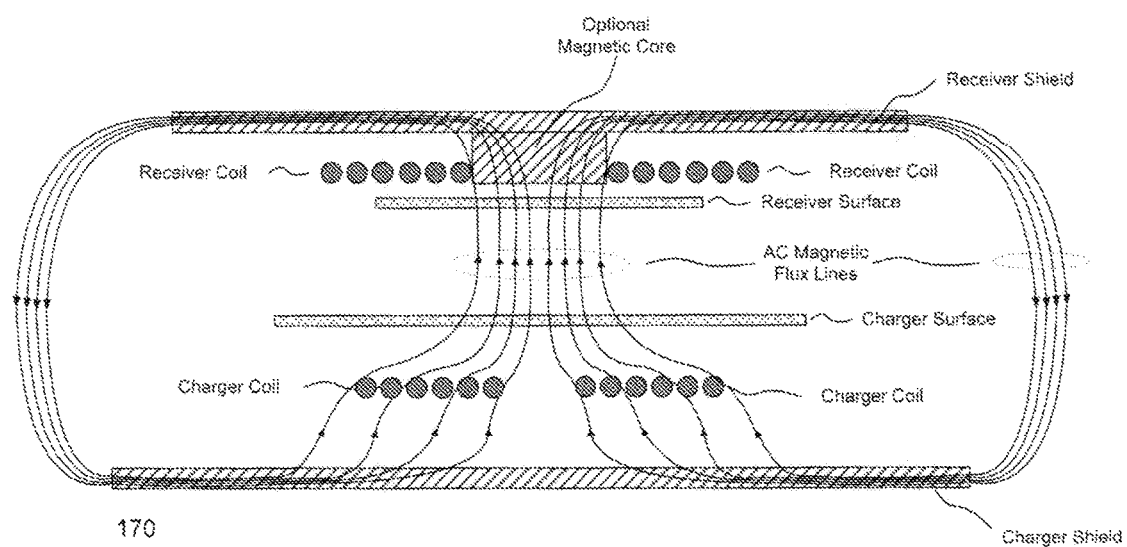
FIG. 6 illustrates a return magnetic flux from a charger, in accordance with an embodiment.

FIG. 5 shows an additional geometry 160 whereby a charger coil 162 is placed on a magnetic flux guide/shielding layer 164 that extends beyond the edges of the coil. The receiver similarly has a magnetic flux/shielding layer 166 that extends beyond the size of the coil 168, allowing an overlap area between these flux layers on the top and bottom sides of the receiver. FIG. 6 shows 170 the return magnetic flux from the charger that passes the receiver coil and is guided efficiently to close on itself. Such an efficient flux guide (FG) geometry results in confinement of power transfer to the area of overlap of a receiver and charger coil, and significant increase in power transfer efficiency and reduction of undesirable electromagnetic emission compared to Magnetic Resonance (MR) systems. It is also possible to further decrease any potential emissions from non-covered areas of the charger coil by covering the charger coil with a magnetic shield layer and combining the FG geometry with the earlier described MC or MA modes of operation.

In accordance with the MC geometry, the reluctance of the flux path in the receiver can be lowered by including high permeability material in the core of the receiver ring coil (similar to a solenoid) or a T-shape core or alike. Many geometries are possible, and these geometries are provided merely as examples. Additionally, while in accordance with an embodiment a Litz wire receiver coil can be used, in accordance with other embodiments, PCB coils and/or a combination of Litz wire and PCB coil can be used.

In accordance with an embodiment, to reduce the reluctance of the path, the receiver coil can be created by using a flux guide material (such as ferrite with permeability greater than 1), with an axis perpendicular (or an angle sufficient to catch the substantially perpendicular flux from the charger) to the surface of the charger. As shown 172 in FIG. 7, Litz wire can be wrapped around the core to create a solenoid type receiver with a relatively small cross section (several mm or smaller by 10 or 20 mm) substantially parallel to the surface of the charger. In one example, the solenoid height (along the direction of axis of wire wrapped around it, and perpendicular to the surface of the charger) can be varied from 10 to 20 mm, but can be shorter. A typical number of turns on the receiver coil can be 7 to 20 turns. Use of a series or parallel capacitor with such a receiver coil provides a resonant circuit whose output can be rectified and smoothed with a capacitor to provide a DC output. To provide regulated power output, as shown in FIGS. 1 and 2, a communication or feedback system between charger and receiver and/or an output stage regulator can also be added.

Figure 8:
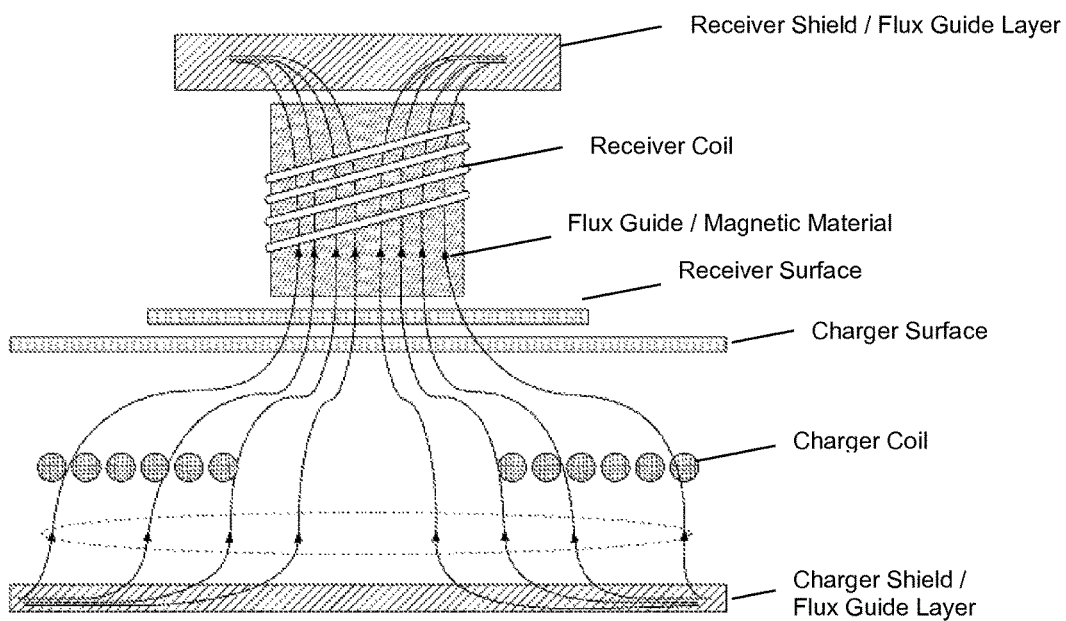
FIG. 8 illustrates a ferrite lower magnetic shield or flux guide, in accordance with an embodiment.

In one example, a charger coil similar to that shown in FIG. 3 and with a thin (0.5 mm thick) ferrite lower magnetic shield/flux guide similar to that shown 174 in FIG. 8 was used. Substantial power transfer (over 20 W) and high efficiencies of up to 55% DC to DC (DC power output of receiver rectifier divided by input to DC charger circuit input power) was received over the entire surface of the charger coil when the charger coil and its associated resonant capacitor were tuned to be resonant at similar frequencies to the receiver coil and its associated capacitor. Power was received with the receiver coil having zero up to several cm of gap from the surface of the charger coil. Such a small solenoid can be provided having very small sizes in one or two dimensions, such that it is shaped as or otherwise resembles a blade, with the contact area being the thin edge of the blade.

Figure 7:
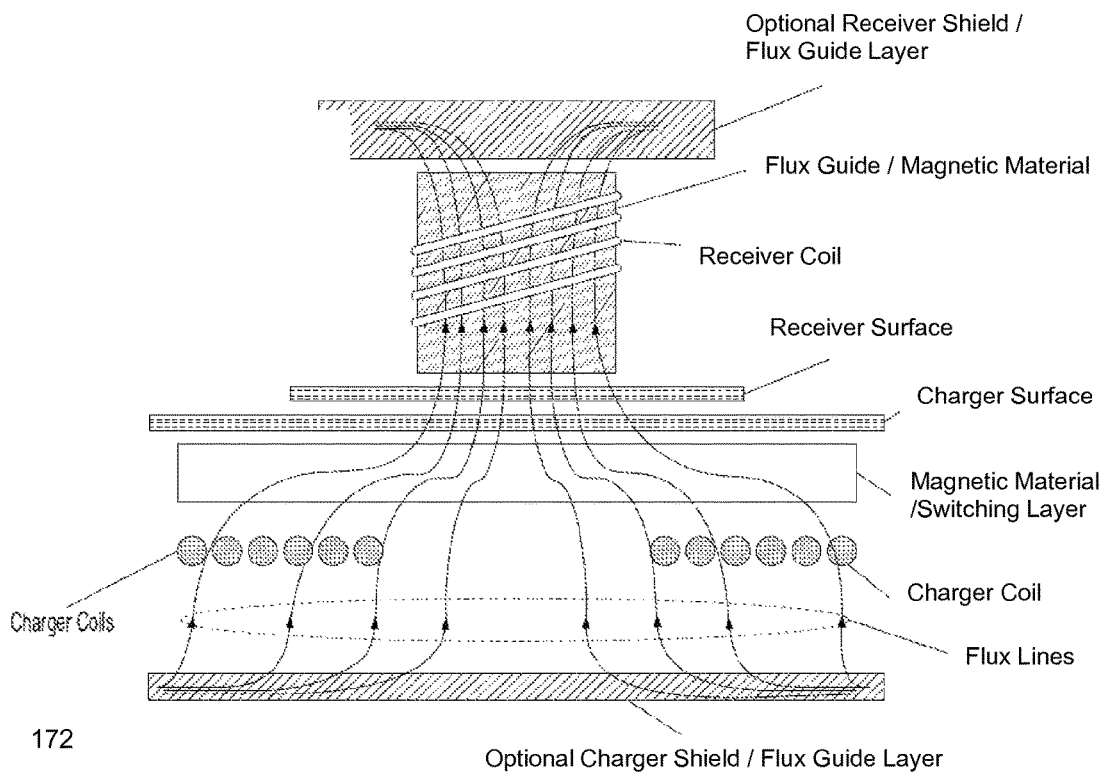
FIG. 7 illustrates wire wrapped around a core to create a solenoid type receiver, in accordance with an embodiment.

In accordance with an embodiment, rotating the angle of the blade solenoid with respect to the perpendicular direction to the surface to the charger can produce large power transfers, confirming that as long as some component of the charger flux is along the axis of the receiver coil, efficient power transfer can be obtained. Both position-free and multiple receiver operation can be provided. As shown in FIG. 7, optionally, an additional magnetic shield/guide layer on the top of the receiver and/or on the bottom of the charger can also be included. In many applications, it is beneficial to utilize receivers that occupy minimal space and are able to fit inside (or inside an optional part of) a small mobile or fixed position device.

In accordance with an embodiment shown in FIG. 8, the charger does not utilize a top magnetic layer, and the flux guiding through the magnetic core and/or magnetic layers at the bottom of charger and/or top of receiver is used to provide a low reluctance path for magnetic flux flow and efficient power transfer.

Some examples of the types of devices that can include a small blade type receiver include mobile phones, MP3 players, and wearable computers such as displays, communication and display watches, and electronic glasses. In some applications, the device to be charged has a small surface area that is in contact with the charger surface, for example cylindrical batteries that are placed vertically to be charged, or devices such as wearable electronic glasses or displays whereby the device has a small surface area when placed against a flat or curved charger. In accordance with an embodiment, use of the flux guide and a smaller cross-section parallel to the surface of the charger, as shown in FIG. 7 or 8, may be useful for these types of applications.

In accordance with an embodiment, a receiver coil or solenoid with a magnetic flux guide can also be constructed to have a somewhat larger area parallel to the surface of the charger, approximating the embodiment illustrated in FIG. 6, but with a flux guide layer or core in the middle of the coil. In this case, the height of this flux guide or core (along the length perpendicular to the surface of the charger) can be made quite short (e.g., 1-2 mm or less).

Figure 9:
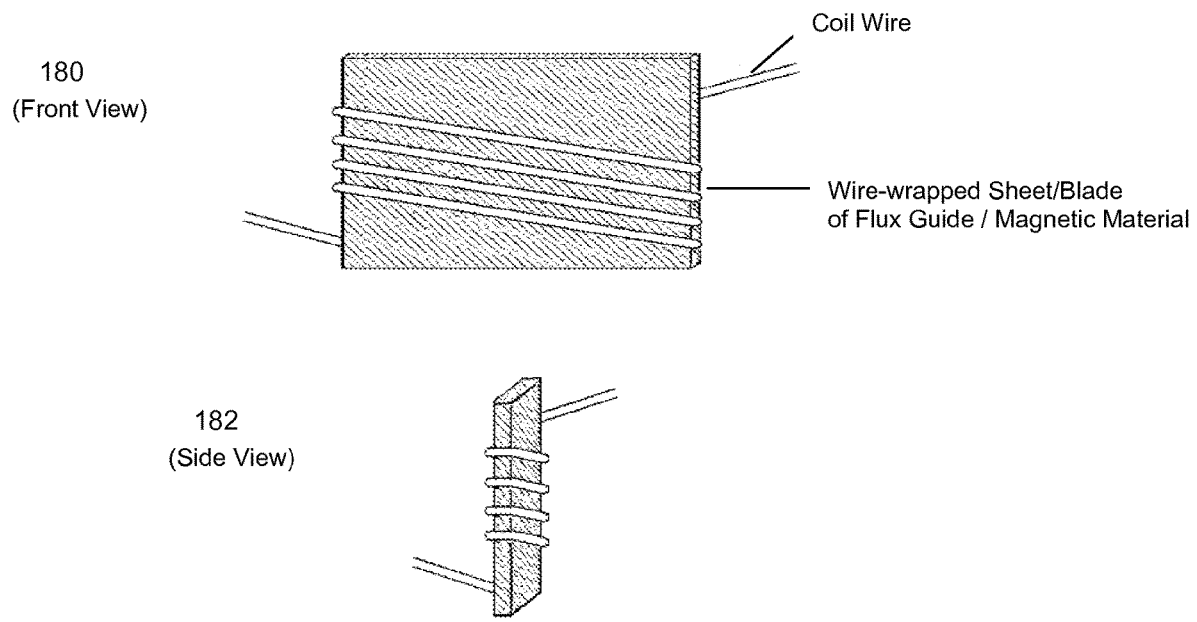
FIG. 9 illustrates a receiver coil wrapped around a very thin magnetic material, in accordance with an embodiment.

In accordance with an embodiment, shown in FIG. 9, the receiver coil can be wrapped around a very thin magnetic material. By way of example, in accordance with an embodiment 180, 182 this material can be 1 mm or less in thickness. In one example, coils comprising 0.6 mm thick Litz wire of bundled wire can be wrapped around 0.3 mm thick sheet of 600 permeability ferrite material (20×0.10×0.3 mm size) and used for such a receiver. Using such a blade type receiver with a coil surface area of 20×0.3 mm on a charger surface of 170 mm×170 mm or larger coil with pattern similar to FIG. 3, power transfer levels exceeding 20 W, and DC to DC power transfer efficiencies of up to 55%, were observed when the receiver coil was placed at any location and orientation (with the axis of the receiver coil having some component perpendicular to the surface of the charger) on or near the surface of the charger. Additionally, significant power transfer was observed when the receiver coil was moved away from the charger coil in a vertical direction (with coil to coil spacing of 20 mm or larger). Considering that the blade type receiver coil surface occupies an area of 0.02% of the area of the charger coil, achieving such a high level of power transfer and efficiency demonstrates that the flux generated at the surface of the charger coil is efficiently guided and channeled to the location of the receiver coil.

In accordance with an embodiment, such a coil can be made to be symmetrical along its winding axis, and can receive power when the coil is flipped vertically. Such a feature may provide additional flexibility and usage in some applications.

Figure 10:
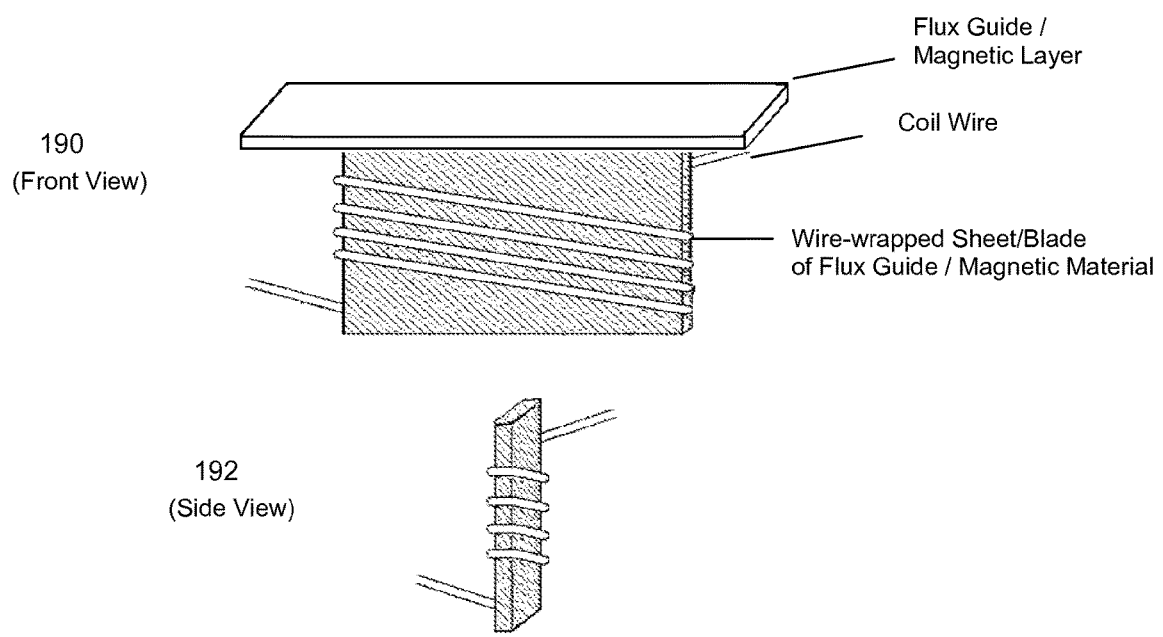
FIG. 10 illustrates the use of additional magnetic or ferrite material or layers added to or otherwise integrated with the top and/or bottom of the receiver coil, in accordance with an embodiment.
Figure 11:
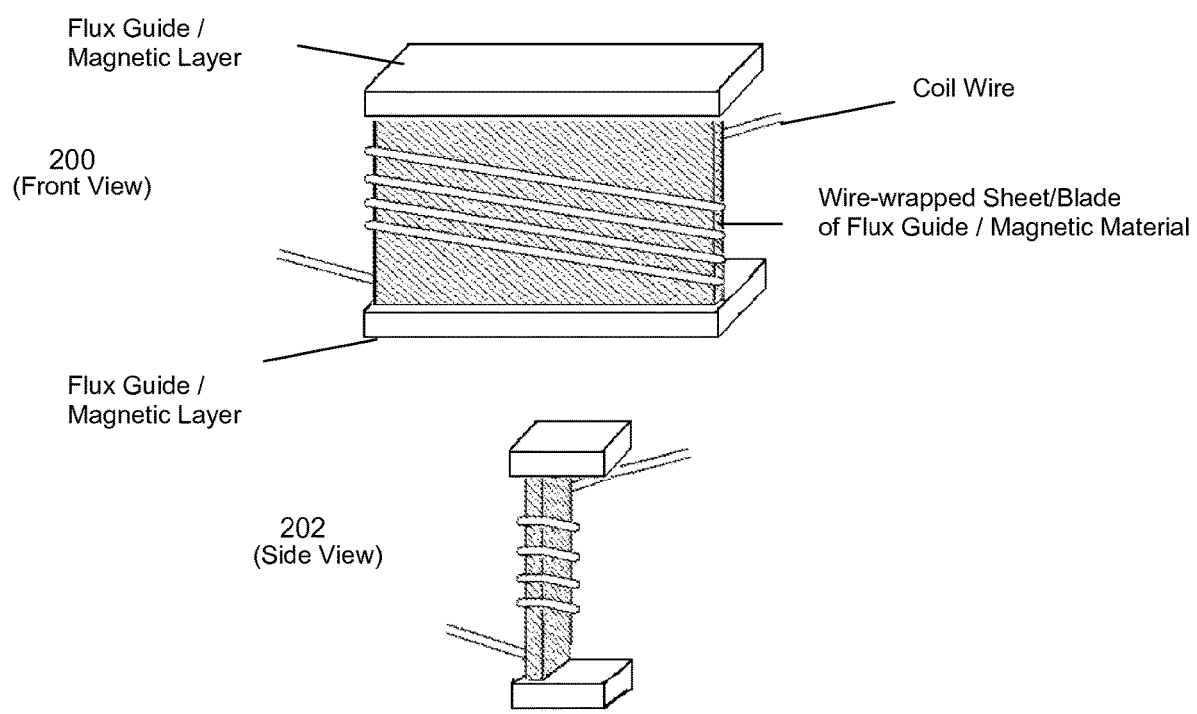
FIG. 11 illustrates the use of additional magnetic or ferrite material or layers added to or otherwise integrated with the top and/or bottom of the receiver coil, in accordance with another embodiment.

In accordance with another embodiment shown 190, 192 in FIG. 10, and 202, 202 in FIG. 11, additional magnetic or ferrite material or layers can be added to or otherwise integrated with the top and/or bottom of the receiver coil and its associated magnetic section. Such layers aid in the guidance of the flux generated in the receiver coil and can provide higher efficiency and/or power.

In accordance with an embodiment, the receiver can be used to charge or power wearable mobile communication and display devices, such as wearable electronic glasses, watches, headsets, or other devices. An example of an embodiment for integration into wearable headsets or electronic display devices or glasses is shown 212 in FIG. 12. In accordance with an embodiment, a device such as an electronic glasses can be oriented on a surface as shown, to receive charging. Alternately, the electronic glasses can be flipped vertically so the top flat side is in contact with a charging surface. In either orientation, the surface area of the device in or near contact with the charger surface can be quite small.

Figure 12:
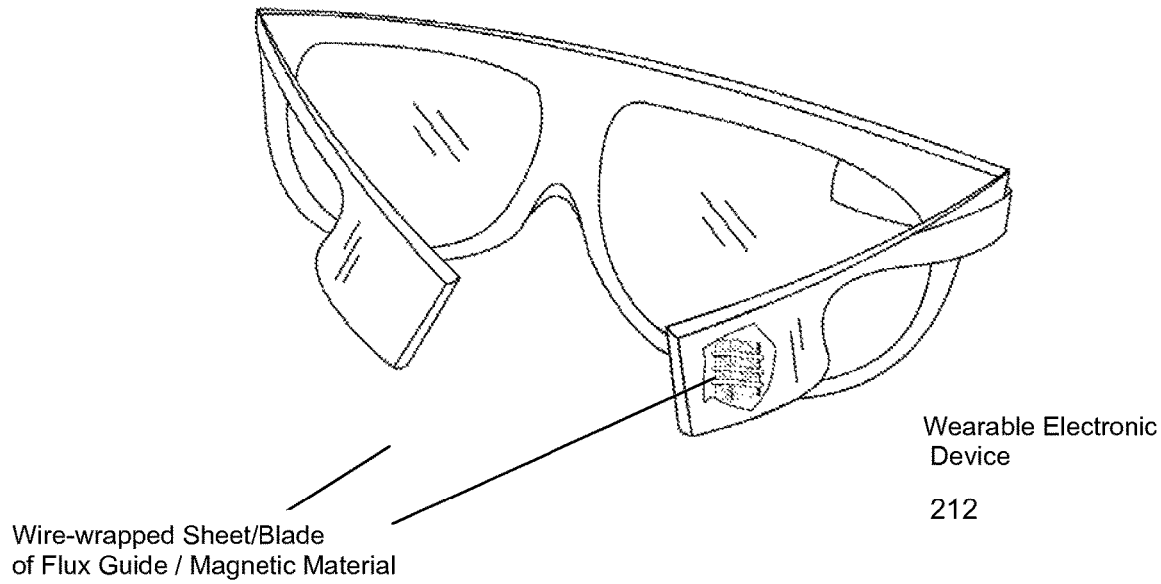
FIG. 12 illustrates integration of a receiver into a wearable headset or electronic display device or glasses, in accordance with an embodiment.
Figure 13:
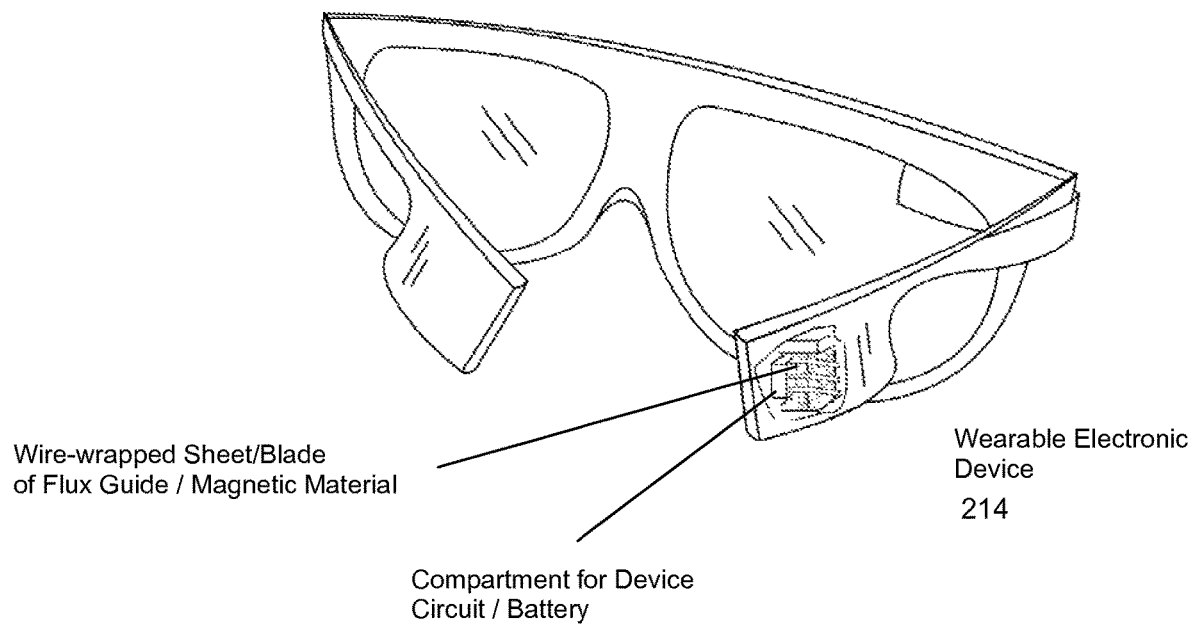
FIG. 13 illustrates an embodiment that incorporates magnetic or ferrite material sections above and below the main coil section, in accordance with an embodiment.

FIG. 12 shows an embodiment that incorporates the receiver coil and/or its associated electronics in a section with a small horizontal (in the plane of the charger coil if the device is laid down on a charger surface) surface area. The embodiments of the receiver coil described above are useful for this implementation, and can also be incorporated in another embodiment 214 shown in FIG. 13 that incorporates magnetic or ferrite material sections above and below the main coil section to further guide the magnetic flux. These layers can also be used to guide or route the charger magnetic flux around the inside cavity and shield any PCB, circuit, battery, or metallic part that may be included in this space from the magnetic field of the charger.

Since, in accordance with an embodiment, such a receiver can be symmetrical in the Z axis (perpendicular to surface of charger or along the axis of the receiver coil winding), the electronic glasses can be laid down in any of the several orientations flatly on the surface and power will be received by the receiver. In addition, the X and Y position freedom created by the charger coil allows the user to place the electronic glasses at any location on the charger, and even at a Z distance, to receive power.

In accordance with an exemplary embodiment, when a receiver with integrated horizontal flux guide sections, such as the embodiment shown in FIG. 11, was placed near the outer areas of a 170 mm×170 mm charger coil such as that shown in FIG. 8, with a charger under a layer of ferrite material flux guide, it was observed that the receiver can receive power even when its coil axis is parallel to the charger surface. This is due to the large parallel (to the surface) component of the charger magnetic flux in these outer areas. The smaller horizontal sections in the receiver coil (shown as the end flux guides in FIG. 11) also aid in guiding the flux into and out of the receiver coil, and enable operation of the receiver in any orientation. This behavior enables a receiver such as that shown in FIG. 11 to be generally rotatable at any angle along an axis perpendicular to the plane of the orientation shown in lower part of FIG. 11, when placed on a charger, and still receive power. This behavior can be useful for those applications where orientation independence is required.

Figure 14:
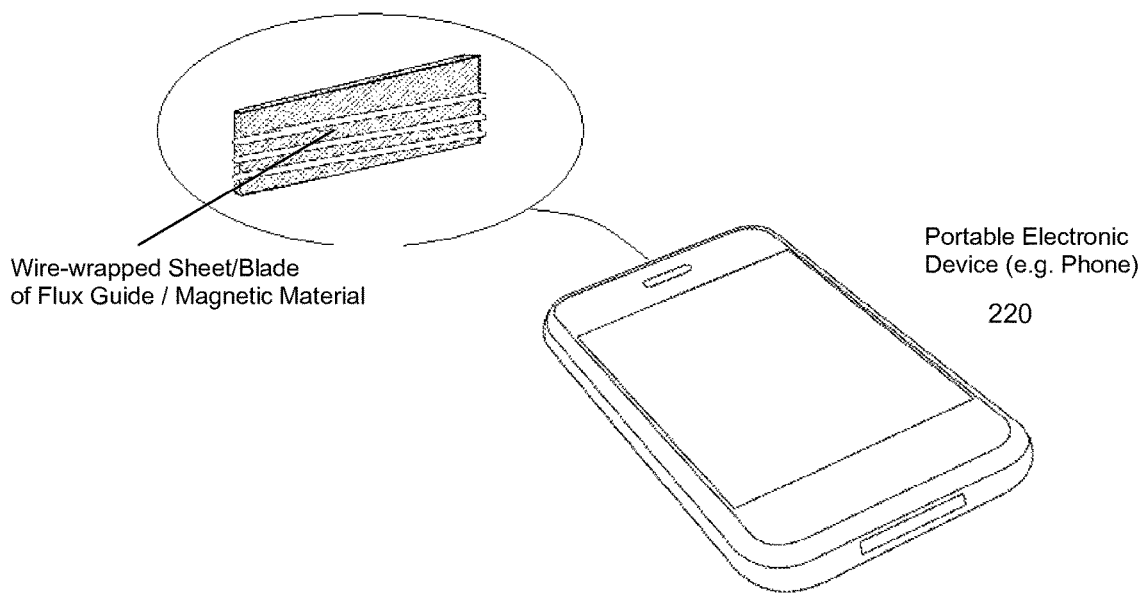
FIG. 14 illustrates integration of a receiver into a mobile phone, in accordance with an embodiment.
Figure 15:
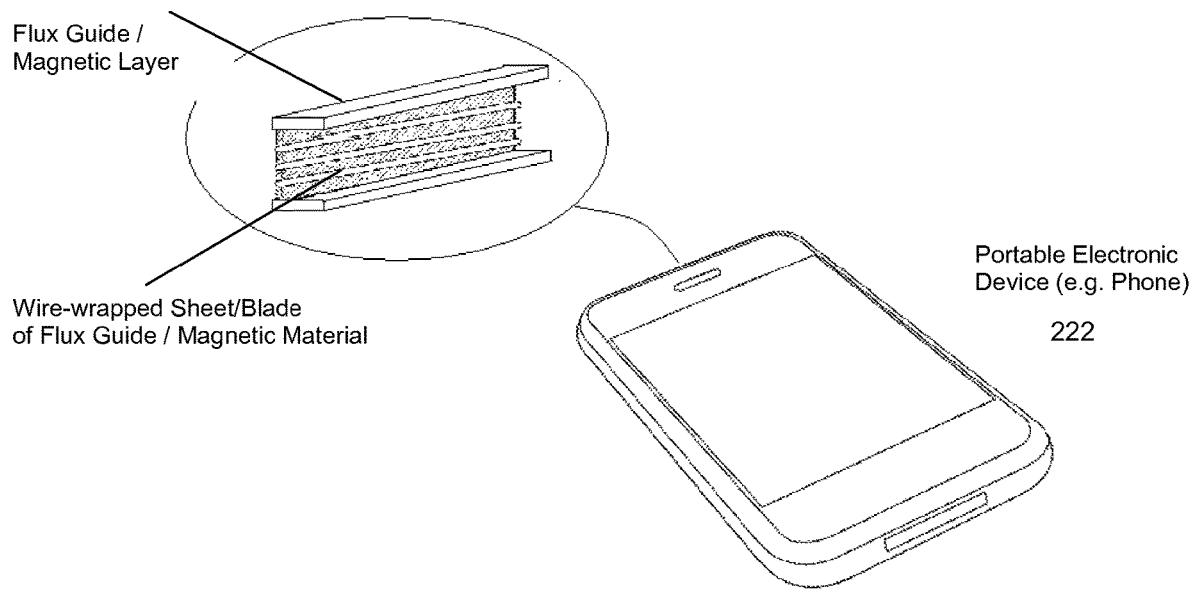
FIG. 15 illustrates that incorporates magnetic or ferrite material sections above and below the main coil section, in accordance with an embodiment.

In accordance with another embodiment, the receiver can be integrated into devices such as mobile phones, MP3 players, tablets, watches, batteries, headsets, or other devices where limited space is available. FIG. 14 shows an embodiment 220 for integration into a mobile phone at an edge of the phone, or somewhere within the body of the phone. Such a phone with the receiver integrated can be charged when placed at any location on a charger surface. In accordance with another embodiment 222, horizontal magnetic or ferrite layers on top and bottom can be used, as shown in FIG. 15.

As described above, in accordance with an embodiment, the receiver coil can be made to be symmetrical along its winding axis, which enables, in either of the embodiments, the phone or other electronic device to be charged with either its back side or its front facing the charger surface. In accordance with an embodiment, the charger and/or the receiver can also be configured to detect the orientation or front-back placement of the device during charging and perform additional functionalities. For example, a phone can be configured so that when the phone is placed face-down on the charger, it can be charged but will enter a "Do Not Disturb" mode so that any incoming calls, messages, texts, emails, etc., will not provide audio, visual or other indications; but, when placed on the charger in its other orientation (display face-up), incoming information can be relayed to the user visually, by audio or even displayed or transmitted to another device (such as transmission to another display when used in cars).

The above illustration is an example of a contextually-aware operation; in accordance with various embodiments, such activities of tying wireless charging to, e.g., launching or performance of other activities or commands can be considered examples of contextually aware charging, additional examples of which are described in U.S. Patent Publication No. 20110050164, which examples can be combined or used with various embodiments of the charger and receiver technologies described herein.

Figure 16:
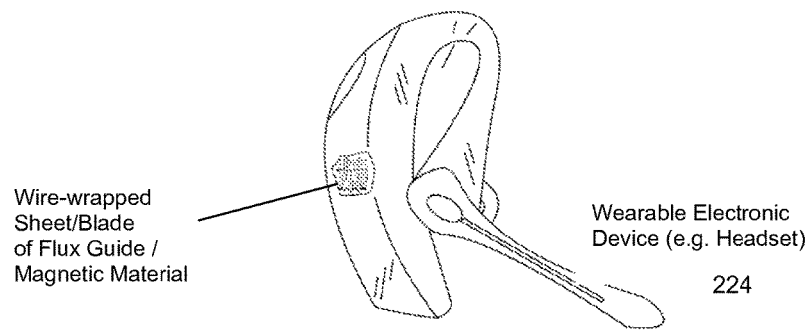
FIG. 16 illustrates integration of a receiver into a headset device, in accordance with an embodiment.

FIG. 16 shows another embodiment 224 for integration of a sheet or blade type receiver coil within an electronic device, in this illustration a headset device, e.g., at the edge or back of the headset, or another suitable location within the body of the headset.

Charger and Receiver Interaction

In accordance with an embodiment, the receiver can be provided as an integral part of a device or battery as described above, or can be provided as an otherwise incomplete device that receives power wirelessly and is intended for installation or attachment in or on the final product, battery or device to be powered or charged, or the receiver can be a complete device intended for connection to a device, product or battery directly by a wire or wirelessly. Examples include replaceable covers, skins, cases, doors, jackets, surfaces, etc for devices or batteries that would incorporate the receiver or part of the receiver and the received power would be directed to the device through connectors in or on the device or battery or the normal wired connector (or power jack) of the device or battery. The receiver can also be a part or device similar to a dongle or insert etc., that can receive power on or near the vicinity of a charger and direct the power to a device or battery to be charged or powered through a wire and/or appropriate connector. Such a receiver can also have a form factor that would allow it to be attached in an inconspicuous manner to the device, such as a part that is attached to the outer surface at the bottom, front, side, or back side of a laptop, netbook, tablet, phone, game player, camera, headset or other electronic device, and routes the received power to the input power connector, battery connector or jack of the device.

In accordance with an embodiment, the connector of such a receiver can be configured such that it has a pass-through or a separate connector integrated into it, so that a wire cable for providing wired charging or power or communication can be connected to the connector without removal of the connector, thus allowing the receiver and its connector to be permanently or semi-permanently be attached to the device throughout its operation and use.

In a more integrated approach, the coil, shield and/or the receiver circuit can be integrated into the construction of the electric or electronic device, and be an integral part of the operation of the device which is powered or charged primarily or as an option (in addition to wired charging) through the wireless power received from the receiver. Many other variations of the receiver implementation are possible, and these examples are not meant to be exhaustive.

In accordance with an embodiment, the receiver can also be provided as a whole or as a part of the electronics, coil, shield, or other part of the system required for receiving power wirelessly. The electronics can comprise discrete components or microcontrollers that when used together provide the wireless receiver functionality, or comprise an Application Specific Integrated Circuit (ASIC) chip or chipset or MCM that is specifically configured to function as the whole or a substantial part of the electronics for wireless receiver system.

In accordance with an embodiment, a system with largely mis-matched (i.e. dissimilar in size or shape) charger and receiver coils can potentially have several advantages. For example, power can be transferred to the receiver coils placed anywhere on the transmitter coil. Several receivers can be placed and powered on one transmitter allowing for simpler and lower cost of transmitter. The system with higher resonance Q can be configured so the gap between the transmitter and receiver coil can be larger than a tightly-coupled system leading to design of systems with more design freedom. In practice, power transfer in distances of several cm or even higher have been demonstrated. Power can be transferred to multiple receivers simultaneously. In addition, the receivers can potentially be of differing power rating or be in different stages of charging or require different power levels and/or voltages.

In accordance with an embodiment, in order to achieve the above characteristics and to achieve high power transfer efficiency, the lower k value is compensated by using a higher Q through design of lower resistance coils, etc. The power transfer characteristics of these systems may differ from tightly-coupled systems and other power drive geometries such as use of resonant converters. Class E amplifiers or Zero Voltage Switching (ZVS) or Zero Current Switching (ZCS) or other power transfer systems may potentially operate more efficiently in these situations. In addition, impedance matching circuits at the charger transmitter and/or receiver may be required to enable these systems to provide power over a range of load values and output current conditions. General operation of the systems can, however be quite similar to the tightly-coupled systems and one or more capacitors in series or parallel with the transmitter and/or receiver coils is used to create a tuned circuit that may have a resonance for power transfer. Operating near this resonance point, efficient power transfer across from the transmitter to the receiver coil can be achieved. Depending on the size difference between the coils and operating points, efficiencies of over 50% up to near 80% have been reported in such loosely-coupled systems.

To provide communication and control between the charger and receiver or receivers, in accordance with an embodiment, a hardware Physical Communication and Control Layer (PCCL) and a software or firmware Command and Control Layer (CCL) can be implemented. Optional methods of communication between the charger and receiver(s) can be provided through the same coils as used for transfer of power, through a separate coil, through an RF or optical link, through RFID, Bluetooth, Wi-Fi, Wireless USB, NFC, Felica, Zigbee, Wireless Gigabit (WiGig), 3G, 4G, etc. or through such protocols as defined by the Wireless Power Consortium (WPC), Alliance for Wireless Power (A4WP), or Power Matters Alliance (PMA), or other protocols such as Dedicated Short Range Communication (DSRC) used for automotive applications or other standards, developed for wireless power, or other communication protocol, or combination thereof.

In simpler architectures, there may be minimal or no communication between the charger and receiver. For example, a charger can be configured to be in a standby power transmitting state, and any receiver in close proximity to it can receive power from the charger. The voltage, power, or current requirements of the device or battery connected to the receiver circuit can be unregulated, or regulated or controlled completely at the receiver or by the device attached to it. In this instance, no regulation or feedback or communication between the charger and receiver may be necessary. In a variation of this, the charger can be configured to be in a state where a receiver in close proximity would bring it into a state of power transmission. Examples of this would be a resonant system where inductive and/or capacitive components are used, so that when a receiver of appropriate design is in proximity to a charger, power is transmitted from the charger to a receiver; but without the presence of a receiver, minimal or no power is transmitted from the charger.

In accordance with an embodiment, in those examples in which communication is provided through the power transfer coils, one method for communication from receiver or receivers to the charger is to modulate a load or impedance in the receiver to affect the voltage and/or current in the receiver coils and therefore create a modulation in the charger coil voltage or current parameters that can be detected through monitoring of its voltage or current. Other methods can include frequency modulation, by combining the received frequency with a local oscillator signal or inductive, capacitive, or resistive modulation of the output of the receiver coil. In addition to communication from receivers to a charger transmitter, it is also possible to modulate the charger voltage at a pre-determined frequency and communication protocol and detect at each receiver to provide communication from the charger to the receivers. Such bi-directional communication may be advantageous in cases where the charger is used to power multiple receivers as will be explained later.

In accordance with an embodiment, the communicated information from a receiver to the charger transmitter can be the output voltage, current, power, device or battery status, validation ID for receiver, end of charge or various charge status information, receiver battery, device, or coil temperature, and/or user data such as music, email, voice, photos or video, or other form of digital or analog data used in a device. It can also be patterns or signals or changes in the circuit conditions that are transmitted or occur to simply notify the presence of the receiver nearby.

In accordance with an embodiment, the data communicated can be any one or more of the information detailed herein, or the difference between these values and the desired value, or simple commands to increase or decrease power, or simply one or more signals that would confirm presence of a receiver or a combination of the above. The receiver and/or charger and/or their coils can also include elements such as thermistors, magnetic shields or magnetic cores, magnetic sensors, and input voltage filters, etc., for safety and/or emission compliance reasons. The receiver can also be combined with other communication or storage functions, such as NFC, Wi-Fi, Bluetooth, etc. In addition, the charger and or receiver can include means to provide more precise alignment between the charger and receiver coils or antennas. These can include visual, physical, or magnetic means to assist the user in alignment of parts. To implement more positioning freedom of the receiver on the charger, the size of the coils can also be mismatched. For example, the charger can comprise a larger coil size, and the receiver a smaller one, or vice versa, so that the coils do not have to be precisely aligned for power transfer.

In accordance with an embodiment, to minimize stand-by power use, the charger can periodically be turned on to be driven with a periodic pattern (a ping process) and if a receiver in proximity begins to draw power from it, the charger can detect power being drawn from it and stay in a transmitting state. If no power is drawn during the ping process, the charger can be turned off or placed in a stand-by or hibernation mode to conserve power, and turned on and off again periodically to continue seeking a receiver.

In accordance with an embodiment, the charger also includes a circuit that measures the current through and/or voltage across the charger coil (for example, a current sensor is shown in FIG. 2 by way of example). As described earlier, various demodulation methods for detection of the communication signal on the charger current or voltage can be used.

While a system for communication between the charger and receiver through the power transfer coils or antennas is described above, in accordance with an embodiment the communication can also be implemented through separate coil or coils, a radio frequency link (AM, FM or other communication method), an optical communication system, or a combination of the above. The communication in any of these methods can also be bi-directional rather than uni-directional as described above.

In accordance with another embodiment, a dedicated RF channel for uni-directional or bi-directional communication between the charger and receiver can be implemented for validation and/or regulation purposes. This system can be similar to the system shown in FIG. 2, except rather than load modulation being the method of communication, the microcontroller (MCU) in the receiver transmits the required information over an RF communication path. A similar system with LED or laser transceivers or detectors and light sources can be implemented. Advantages of such a system include that the power received is not modulated and therefore not wasted during communication and/or that no noise due to the modulation is added to the system.

In accordance with an embodiment, the microcontroller unit (MCU) in the charger (MCU1) is responsible for recognizing and understanding the communication signal from the detection/demodulation circuit and, depending on the algorithm used, making appropriate adjustments to the charger coil drive circuitry to achieve the desired output voltage, current or power from the receiver output. In addition, MCU1 is responsible for processes such as periodic start of the charger to seek a receiver at the start of charge, keeping the charger on when a receiver is found and accepted as a valid receiver, continuing to apply power and making appropriate adjustments, and/or monitoring temperature or other environmental factors, providing audio or visual indications to the user on the status of charging or power process, etc., or terminating charging or application of power due to end of charge, or customer preference, or over temperature, over current, over voltage, or some other fault condition or to launch or start another program or process.

In accordance with an embodiment, once the charger MCU1 has received a signal and decoded it, it can take action to provide more or less power to the charger coil. This can be accomplished through known methods of adjusting the frequency, duty cycle or input voltage to the charger coil or a combination of these approaches. Depending on the system and the circuit used, the MCU1 can directly adjust the bridge driver, or an additional circuit such as a frequency oscillator can be used to drive the bridge driver or the FETs. A typical circuit for the receiver, in accordance with a load modulation communication system embodiment, is shown in FIG. 2.

In accordance with an embodiment, the receiver circuit can include an optional capacitor C2 in parallel or series with the receiver coil to produce a tuned receiver circuit. This circuit is known to increase the efficiency of a wireless power system. The rectified and smoothed (through rectifiers and capacitors) output of the receiver coil and optional capacitor is either directly or through a switch or regulator applied to the output. A microcontroller MCU2 is used to measure various values such as voltage Vi, current, temperature, state of charge, battery full status, end of charge, etc. and to report back to the charger to provide a closed loop system with the charger as described above. In the circuit shown in FIG. 2, the receiver MCU2 communicates back to the charger by modulating the receiver load by rapidly closing and opening a switch in series with a modulation load or impedance at a pre-determined speed and coding pattern. This rapid load modulation technique at a frequency distinct from the power transfer frequency can be easily detected by the charger. A capacitor and/or inductor can also be used as the modulation load.

In accordance with other embodiments, other methods of communication through varying the reactive component of the impedance can also be used. The modulation scheme shown in FIG. 2 is shown only as a representative method and is not meant to be exhaustive. As an example, the modulation can be achieved capacitively, by replacing the resistor with a capacitor. In this instance, the modulation by the switch in the receiver provides an advantage that by choosing the modulation frequency appropriately, it is possible to achieve modulation and signal communication with the charger coil and circuitry, with minimal power loss (compared to the resistive load modulation).

The receiver in FIG. 2 also shows an optional DC regulator that is used to provide constant stable voltage to the receiver MCU2. This voltage supply may be necessary to avoid drop out of the receiver MCU2 during startup conditions where the power is varying largely or during changes in output current, and also to enable the MCU2 to have a stable voltage reference source so it can measure the Vi voltage accurately. Alternatively, a switch to connect or disconnect the load can be used or combined with the regulator. To avoid voltage overshoots during placement of a receiver on a charger or rapid changes in load condition, a voltage limiter circuit or elements like Transit Voltage Suppressor (TVS), Zener diodes or regulators or other voltage limiters can also be included in the receiver.

In the above description, a uni-directional communication (from the receiver to the charger) is described. However, this communication can also be bi-directional, and data can be transferred from the charger to the receiver through modulation of the voltage or current in the charger coil and read back by the microcontroller in the receiver detecting a change in the voltage or current, etc.

In accordance with an embodiment, the communication between the receiver and charger needs to follow a pre-determined protocol, baud rate, modulation depth, etc. and a pre-determined method for hand-shake, establishment of communication, and signaling, etc., as well as optionally methods for providing closed loop control and regulation of power, voltage, etc., in the receiver.

In accordance with an embodiment, a typical wireless power system can be as follows: the charger periodically activates the charger coil driver and powers the charger coil with a drive signal of appropriate frequency. During this 'ping' process, if a receiver coil is placed on or close to the charger coil, power is received through the receiver coil and the receiver circuit is energized. The receiver microcontroller is activated by the received power and begins to perform an initiation process whereby the receiver ID, its presence, power or voltage requirements, receiver or battery temperature or state of charge, manufacturer or serial number and/or other information is sent back to the charger. If this information is verified and found to be valid, then the charger proceeds to provide continuous power to the receiver. The receiver can alternately send an end of charge, over-temperature, battery full, or other messages that will be handled appropriately by the charger and actions performed. The length of the ping process should be configured to be of sufficient length for the receiver to power up its microcontroller and to respond back and for the response to be received and understood and acted upon. The length of time between the pings can be determined by the implementation designer. If the ping process is performed often, the stand-by power use of the charger is higher. Alternately, if the ping is performed infrequently, the system will have a delay before the charger discovers a receiver nearby; so in practice, a balance may be suitable.

Alternatively, in accordance with an embodiment, the ping operation can be initiated upon discovery of a nearby receiver by other means. This provides a very low stand-by power use by the charger and can be performed by including a magnet in the receiver and a magnet sensor in the charger or through optical, capacitive, weight, NFC or Bluetooth, RFID or other RF communication or other methods for detection.

Alternatively, in accordance with an embodiment, the system can be configured or implemented to be always ON (i.e., the charger coil is powered at an appropriate drive frequency) or pinged periodically and presence of the receiver coil brings the coil to resonance with the receiver coil and power transfer occurs. The receiver in this instance may not even contain a microcontroller and act autonomously and may simply have a regulator in the receiver to provide regulated output power to a device, its skin, case, or battery. In those embodiments in which periodic pinging is performed, the presence of a receiver can be detected by measuring a higher degree of current flow or power transfer or other means, and the charger can simply be kept on to continue transfer of power until either the power drawn falls below a certain level or an end of charge and/or no device present is detected.

In another embodiment, the charger can be in an OFF or standby, or low or no power condition, until a receiver is detected by means of its presence through a magnetic, RF, optical, capacitive or other methods. For example, in accordance with an embodiment the receiver can contain an RFID chip and once it is present on or nearby the charger, the charger can turn on or begin pinging to detect a receiver.

In accordance with an embodiment, the protocol used for communication can be any of, e.g., common RZ, NRZ, Manchester code, etc., used for communication. As described above, the charger can periodically start and apply a ping voltage of pre-determined frequency and length to the charger coil. The receiver is then activated, and can begin to send back communication signals. The communication signal can include an optional preamble that is used to synchronize the detection circuit in the charger and prepare it for detection of communication. A communication containing a data packet may then follow, optionally followed by checksum and parity bits, etc. Similar processes are used in communication systems and similar techniques can be followed. In accordance with an embodiment, the actual data packet can include information such as an ID code for the receiver, a manufacturer's code, received voltage, power, or current values, status of the battery, amount of power in the battery, battery or circuit temperature, end of charge or battery full signals, presence of external wired charger, or a number of the above. Also this packet may include the actual voltage, power, current, etc. value or the difference between the actual value and the desired value or some encoded value that will be useful for the charger to determine how best to regulate the output.

Alternatively, in accordance with an embodiment, the communication signal can be a pre-determined pattern that is repetitive and simply lets the charger know that a receiver is present and/or that the receiver is a valid device within the power range of the charger, etc. Any combination of systems can be configured to provide the required performance.

In accordance with an embodiment, in response to the receiver providing information regarding output power or voltage, etc., the charger can modify voltage, frequency, duty cycle of the charger coil signal or a combination of the above. The charger can also use other techniques to modify the power out of the charger coil and to adjust the received power. Alternatively, the charger can simply continue to provide power to the receiver if an approved receiver is detected and continues to be present. The charger can also monitor the current into the charger coil and/or its temperature to ensure that no extra-ordinary fault conditions exist. One example of this type of fault may be if instead of a receiver, a metal object is placed on the charger.

In accordance with an embodiment, the charger can adjust one or more parameters to increase or decrease the power or voltage in the receiver, and then wait for the receiver to provide further information before changing a parameter again, or it can use more sophisticated Proportional Integral Derivative (PID) or other control mechanism for closing the loop with the receiver and achieving output power control. Alternatively, as described above, the charger can provide a constant output power, and the receiver can regulate the power through a regulator or a charger IC or a combination of these to provide the required power to a device or battery.

Various manufacturers may use different encodings, and also bit rates and protocols. The control process used by different manufacturers or protocols may also differ, further causing interoperability problems between various chargers and receivers. A source of interoperability differences may be the size, shape, and number of turns used for the power transfer coils. Furthermore, depending on the input voltage used, the design of a wireless power system may step up or down the voltage in the receiver depending on the voltage required by a device by having appropriate number of turns in the charger and receiver coils. However, a receiver from one manufacturer may then not be able to operate on another manufacturer charger due to these differences in designs employed.

In accordance with an embodiment, it is therefore beneficial to provide a system that can operate with different receivers or chargers and can be universal. Recently, there has been some movement to standardize the frequency of operation, the coil and electronics characteristics, the identification and communication method, messaging and protocol and other aspects of the systems to allow interoperability between systems from different manufacturers. Several interoperability Standards and Specifications in this area have been established or under consideration. These include the WPC interoperability specification, the Consumer Electronics Association Standard for wireless power, the Alliance for Wireless Power (A4WP), Power Matters Alliance (PMA), the Consumer Electronics Association (CEA) Wireless Power Standards working group and Wireless Power Standards for Electric Vehicle charging, and other international efforts for Specification and Standards development.

The resonant frequency, F of any LC circuit is given by: F=½·pi. LC, where L is the Inductance of the circuit or coil in Henry and C is the Capacitance in Farads.

For example, in the system shown in FIG. 3, one may use the values of C1 and L1 in the above calculation for a free running charger and, as a receiver is brought close to this circuit, this value is changed by the mutual coupling of the coils involved. In the example that a ferrite shield layer is used behind a coil in the charger and/or receiver, the inductance of the coil is affected by the permeability of the shield and this modified permeability should be used in the above calculation.

In accordance with an embodiment, to be able to detect and power or charge various receivers, the charger can be configured such that the initial ping signal is at such a frequency range to initially be able to power and activate the receiver circuitry in any receiver during the ping process. After this initial power up of the receiver, the charger communication circuit should be able to detect and decode the communication signal from the receiver. Many microcontrollers are able to communicate in multiple formats and/or may have different input N D converter pins that can be configured differently to simultaneously receive the communication signal and synchronize and understand the communication at different baud rates and protocols. In accordance with an embodiment, the charger firmware can then decide on which type of receiver is present and proceed to regulate or implement what is required (end of charge, shut-off, fault condition, etc.). Depending on the message received, the charger can then decide to change the charger driver voltage amplitude, frequency, or duty cycle, or a combination of these or other parameters to provide the appropriate regulated output at the receiver output.

In accordance with an embodiment, the charger's behavior can also take into account the difference in the coil geometry, turns ratio, etc. For example, a charger and receiver pair from one or more manufacturers may require operation of the charger drive voltage at 150 kHz. However, if the same receiver is placed on a charger from another manufacturer or driven with different coil or input voltage combination, to achieve the same output power, the charger frequency may need to be 200 kHz. The charger program may detect the type of receiver placed on it and shift the frequency appropriately to achieve a baseline output power and continue regulating from there. In accordance with an embodiment, the charger can be implemented so that it is able to decode and implement multiple communication and regulation protocols and respond to them appropriately. This enables the charger to be provided as part of a multi-protocol system, and to operate with different types of receivers, technologies and manufacturers.

Similar techniques can be used to allow a receiver to be chargeable on chargers utilizing different protocols for communication and control. For example, the receiver may recognize the type of charger being used by deciphering the frequency of the charger operation or its ping (through frequency filtering or other techniques) and communicate using different protocols and communication signals accordingly.

In accordance with an embodiment, for receivers that contain an onboard output stage regulator before the output power, stability of the input voltage to the regulator is not as critical since the regulator performs a smoothing function and keeps the output voltage at the desired level with any output load changes (such as during battery charging). The output of the regulator is then directed to circuitry such as a power management IC (PMIC), or to a battery for charging, or directly connected to the device for use in instances where the receiver acts as a power supply to a device without internal batteries, or a combination of the above. Where an output regulator stage is used in a receiver it is critical for the wireless receiver not to exceed the maximum rated input voltage of the output stage regulator or to drop below a level required so that the output voltage from the regulator could no longer be maintained at the required value. Various types of output stage regulator such as buck, boost, buck-boost, linear etc., can be used as this output stage. However, in general, inclusion of a regulator and/or a charger IC or PMIC chip (for batteries) relaxes the power/voltage regulation requirements of the wireless power receiver portion of the circuit at the expense of the additional size and cost of this component. In accordance with some embodiments, simpler voltage limiting output stages such as Zener diodes, TVS or other voltage limiting or clamping ICs or circuits, can be used.

In accordance with another embodiment, the receiver can also include variable or switchable reactive components (capacitors and/or inductors) that would allow the receiver to change its resonant condition to affect the amount of power delivered to the device, load or battery. The receiver and/or charger and/or their coils can also include elements such as thermistors, magnetic shields or magnetic cores, magnetic sensors, and input voltage filters, for safety and/or emission compliance reasons.

In accordance with an embodiment, the systems described herein can use discrete electronics components or some or all of the functions described above can be integrated into an Application Specific Integrated Circuit (ASIC) or MCMs to achieve smaller footprint, better performance, noise, etc. and/or cost advantages. Such integration is common in the electronics industry and can provide additional advantages here.

While the system above describes a system wherein the communication is primarily through the coil, as described earlier, communication can also be implemented through a separate coil, RF, optical system or a combination of the above. In such circumstances, a multi-protocol system can also be used to interoperate between systems with different communication and/or control protocols or even means of communication.

Flexible Systems with Multiple Protocols and Technologies

In accordance with an embodiment, a receiver or receivers placed on or near a charger can communicate with the charger in a variety of communication protocols according to different wireless charging standards, protocols or different proprietary methods. To distinguish them and provide for efficient operation, the charger can be programmed to recognize different messages received, and operate differently.

For example, different protocols exist for communication and control for charging a single receiver placed on a charger. Some systems may require the charger to control the voltage output from the receiver coil (that is rectified and sent to an output of the system or to a regulator) within a tight tolerance, and cannot tolerate a large range. An example of such a protocol or standard is the Wireless Power Consortium (WPC) or Chi, A4WP, PMA or other standard which is designed to provide tight receiver coil output voltage tolerances and also requires charger frequency range of 110 to 205 kHz or higher. In accordance with an embodiment a charger system can be configured so that it recognizes such a receiver and controls the output to within its target range. However, in other instances receivers may be designed as described above that can tolerate a larger Vi range by using an output receiver regulator stage to allow multi-receiver charging.

In accordance with an embodiment, to address these use cases, the charger hardware, firmware or software can be configured to recognize the presence of such receivers and operate using a different algorithm to keep one or several receiver voltage ranges to within a larger acceptable range, and provide multi-receiver charging capability. This allows one charger to be interoperable with two or more protocols and systems.

In accordance with an embodiment, the charger systems or protocols can employ different power transfer and/or communication frequencies, or different communication methods (e.g., in-band through coil, and out of band through Wi-Fi or Bluetooth or proprietary systems) to communicate and also transfer power to receivers utilizing different protocols. The approaches described herein can be used to enable interoperability between such systems.

In accordance with an embodiment, the charger can use one or more driving circuits, communication methods or protocols and/or charger power or communication coils or antennas to simultaneously power different receiver coils utilizing different protocols, standards and/or power levels or voltages.

In accordance with an embodiment, the charger coil and resonant capacitor are tuned to provide the operating frequency of the charger, and the associated receiver and its resonant capacitor is similarly tuned to the vicinity of the same frequency for optimal power transfer. It is possible to provide and control power to two or more receivers simultaneously with one or more charger coils, by multiplexing the power transfer frequency.

In accordance with another embodiment, the charger can contain several resonant capacitors, such as C1 illustrated in FIG. 2, which can be switched to form resonances with the charger coil L1, and to provide charger resonances at different frequencies. For example, depending on the protocol of the receiver, the charger can be configured to switch to use a different C1 in series with its coil to optimize power transfer at the preferred operating frequency of receivers from different protocols.

In accordance with an embodiment, the charger can first use one C1 value and perform a ping operation to discover receivers adhering to a frequency of operation with that capacitor value and with the appropriate communication protocol. If an appropriate receiver is discovered, it can continue to provide power at that frequency and protocol. If no such receiver is found, it can switch to use a different value of C1, and repeat the ping and rotate between different C1 values and ping frequencies until appropriate receiver or receivers are discovered. An advantage of using several capacitors and switching between them for different protocols and/or operating frequencies is that higher power transfer efficiencies and/or communication may be obtained compared to using a fixed C1 value.

Multi-Device Charging

Figure 17:
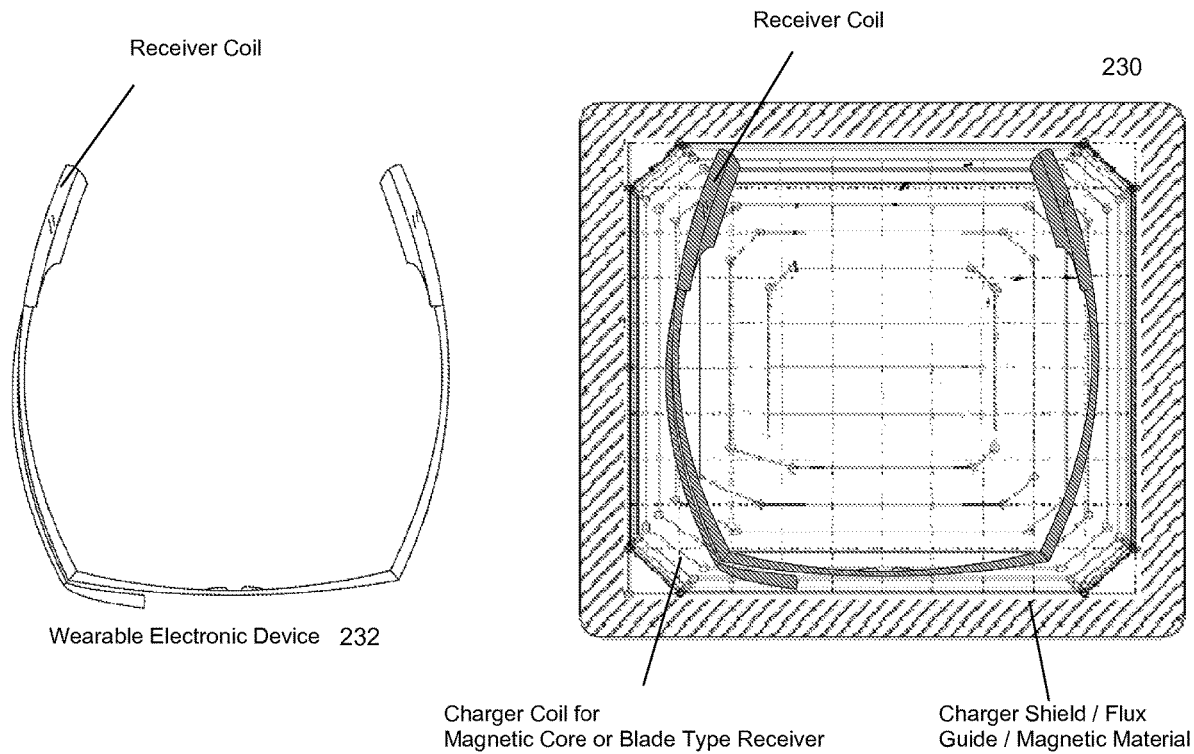
FIG. 17 illustrates a charger for use in coupling to a blade type receiver in the outer perimeter of the charger surface, in accordance with an embodiment.

FIG. 17 illustrates a charger 230 for use in coupling to a blade type receiver in the outer perimeter of the charger surface, which can be used to power a device or receiver having a geometry similar to that shown in FIG. 7 or 8, in this example an electronic glasses device 232.

Figure 18:
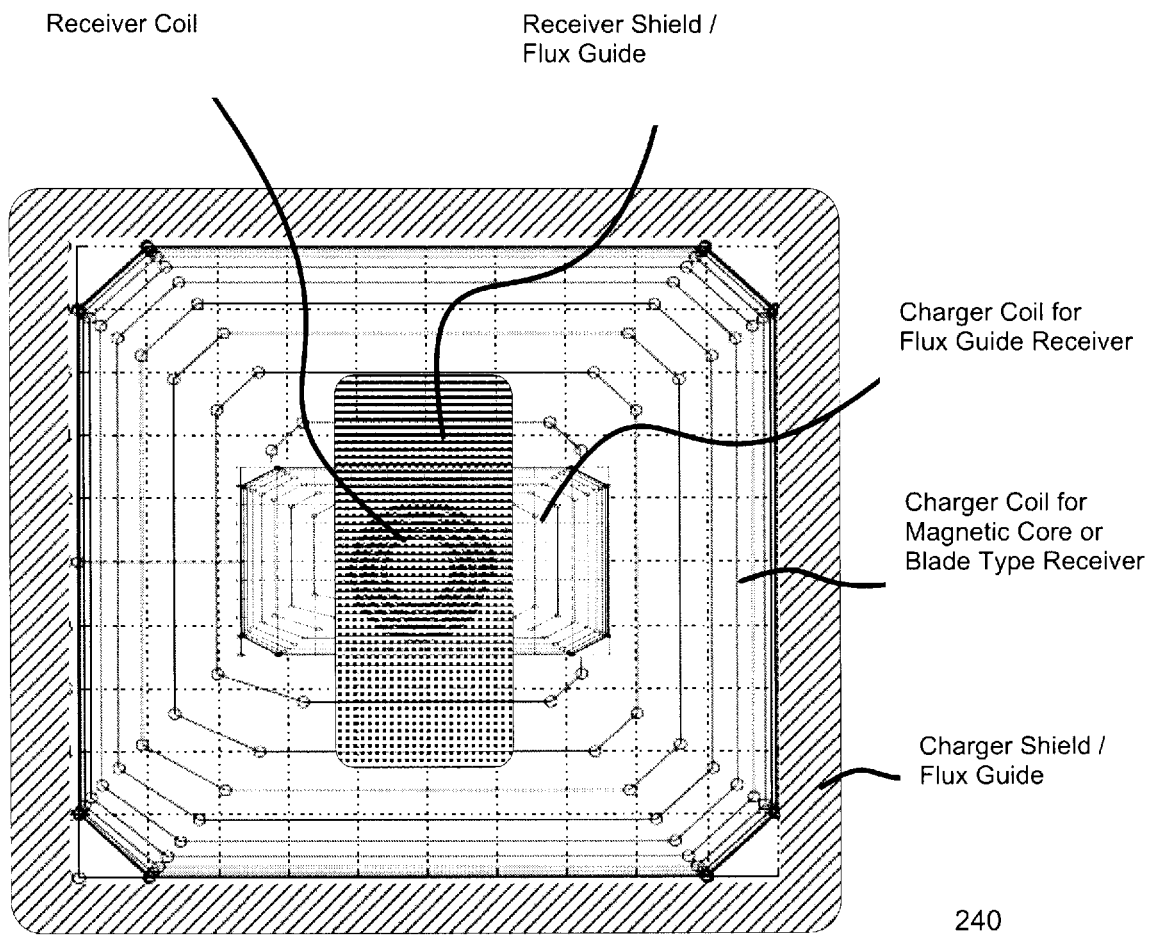
FIG. 18 illustrates a charger that provides different sections with different operating principles or protocols and/or driving and/or communication sections, in accordance with an embodiment.
Figure 19:
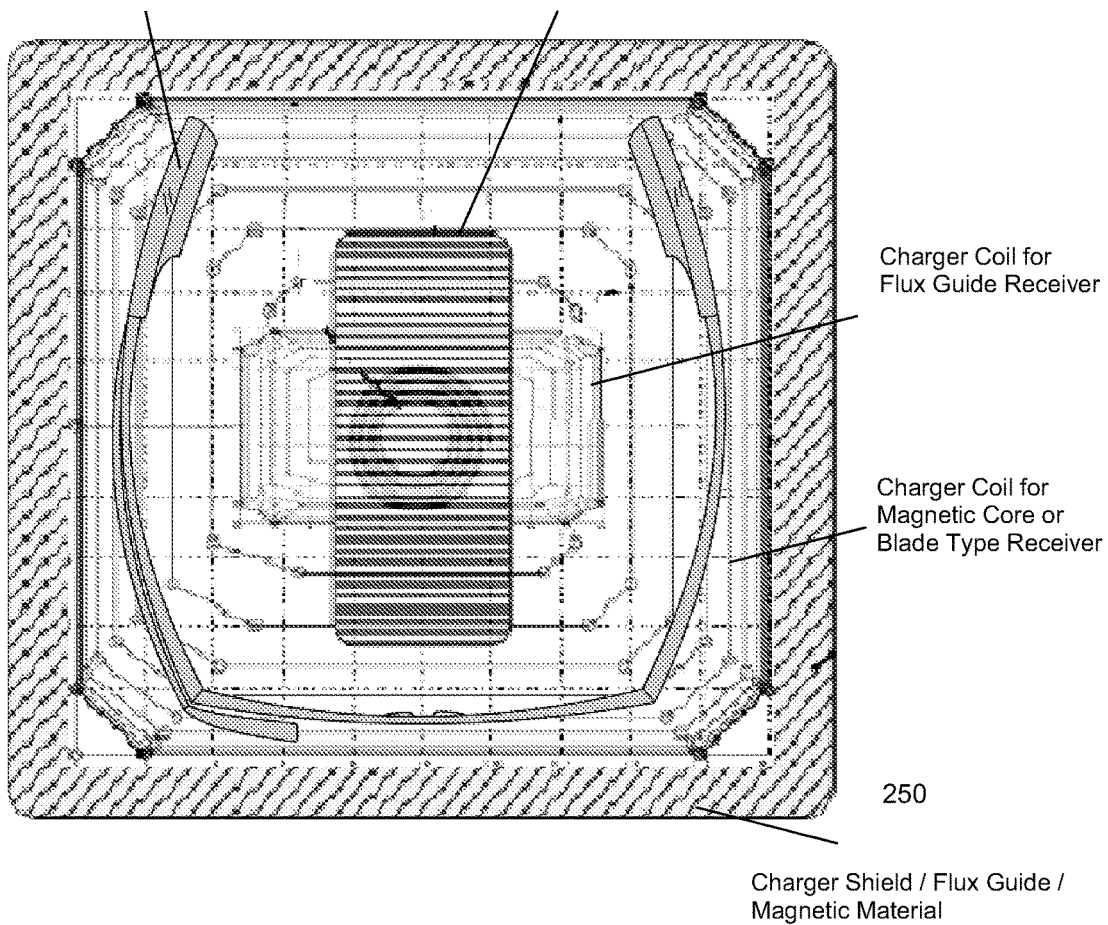
FIG. 19 illustrates a charger that provides different sections, in accordance with another embodiment.

In accordance with an embodiment, the system allows mixing or combining of different technologies on the same charger and/or receiver, or different locations or areas of the same charger. As an illustrative example, it may be desirable to charge two types of device simultaneously with different characteristics. For example, FIG. 18 and FIG. 19 show embodiments 240, 250 wherein the charger includes a large magnetic/ferrite layer below. A plurality (e.g., two or more) separate coil structures are used on top of the magnetic layer in the charger to provide, in this example, two or more different sections (areas) with different operating principles or protocols and/or driving and/or communication sections.

In the example shown in FIG. 18, the central portion can use one central coil to create a flux guide charge section, as described above in accordance with the embodiment in FIG. 5. In conjunction with an appropriate flux guide type of receiver coil, this can provide position-independent charging or power transfer in this central section. In addition, as further shown in FIG. 18, another larger coil area can be integrated into the charger and used to create a larger charger area to be used with a receiver similar to the solenoid or blade type receiver coils described above.

In accordance with an embodiment, since the operating frequency of each coil is defined by its inductance and associated resonant capacitor, the embodiments of the system shown in FIGS. 18 and 19 can be provided so that the two coils operate either in similar, or in completely different, frequency range (frequency multiplexing) to power any associated receivers. In accordance with an embodiment, each coil can be driven by a separate driver circuit and communicate with the associated receivers using load modulation, RF or optical communication channels or combination thereof as described earlier, and can be completely independent.

Figure 20:
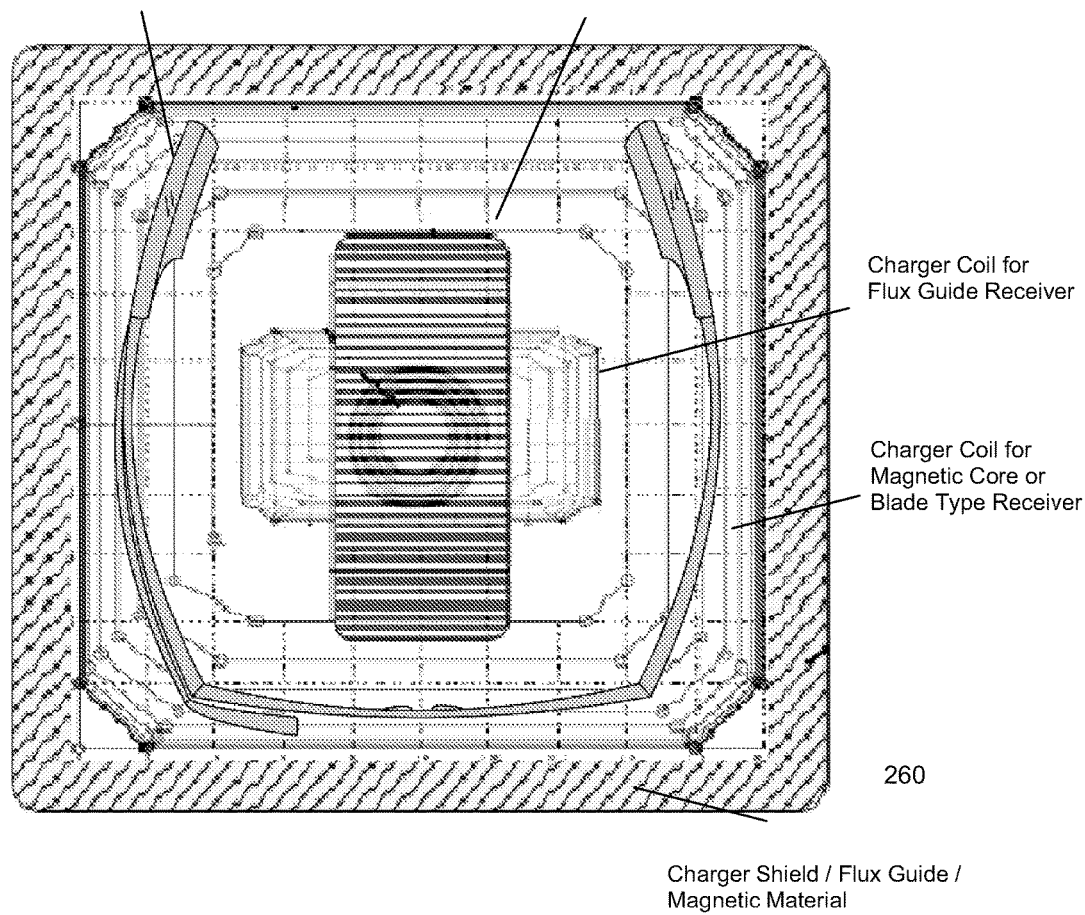
FIG. 20 illustrates a charger that provides different sections, in accordance with another embodiment.

In accordance with another embodiment 260 shown in FIG. 20, two charger coils for charging two different types of devices or receivers can be provided as distinct coils that are physically separated from one another in space and location. For example, a charger coil can be used to provide magnetic field and efficient coupling to a blade type receiver in the outer perimeter of a charger surface and used to power a receiver in a geometry similar to shown in FIG. 7 or 8, while a charger optimized for flux guide power transfer (using a geometry such as that shown in FIGS. 5 and 6) can be used in the center of the charger.

In accordance with an embodiment, the two coils can be distinct or driven by different power drivers and/or use different communication systems and/or protocols. As an example, one of the coils and its associated electronics may use in-band or load modulation for communication and control, and the other one may use out of band or RF communication. The two different sections can also use different or same frequency for power transfer as needed to optimize performance for the associated receivers.

In accordance with an embodiment, each charger section can also charge or power multiple receivers placed on that section. As can be seen, such an embodiment allows the system designer to optimize the performance of a charger to power or charge multiple device types appropriately. In the example shown in FIG. 20, an electronic display device with a very narrow and small receiver area can be charged position-free when it is placed on the outer regions of the pad, while another device such as a mobile phone with a receiver that may be larger (e.g., with a flat coil with flux guide as shown on the back of the device) can be charged in the central area of the charger. Such a combined performance charger may be useful in various applications, and for an end-user.

The above description and embodiments are not intended to be exhaustive, and are instead intended to only show some examples of the rich and varied products and technologies that can be envisioned and realized by various embodiments. It will be evident to persons skilled in the art that these and other embodiments can be combined to produce combinations of above techniques, to provide useful effects and products.

Some aspects of embodiments of the present invention can be conveniently implemented using a conventional general purpose or a specialized digital computer, microprocessor, or electronic circuitry programmed according to the teachings of the present disclosure. Appropriate software coding can readily be prepared by skilled programmers and circuit designers based on the teachings of the present disclosure, as will be apparent to those skilled in the art.

In some embodiments, the present invention includes a computer program product which is a storage medium (media) having instructions stored thereon which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for wireless charging comprising,
a charger including a charger coil generally having a substantially planar surface and a thin magnetic substantially planar layer and charger drive circuit including resonant capacitors to apply an alternating voltage to the charger coil,
a receiver, including a receiver coil and a receiver electronic circuit including one or more resonant capacitors and a rectifier, that is coupled to a mobile device for powering or charging the mobile device, wherein the receiver coil is a solenoid coil including a ferrite core with a relative magnetic permeability exceeding 1 with Litz wire wrapped around the ferrite core along the winding axis, together forming a solenoid, and the ferrite core extending beyond the ends of the wound wire section, wherein the solenoid coil is elongated such that the two ends of the solenoid coil are smaller in their cross-sectional dimensions than the length of the solenoid along the winding axis, and
wherein the charger coil area is larger than the area of each of the ends of the solenoid and the charger coil has a geometry so when it is driven by the charger drive circuit, an inductive magnetic field in a direction substantially perpendicular to the substantially planar surface of the charger coil at the surface of the charger coil is generated, and
wherein when the receiver coil is placed near the surface of the charger coil in an enclosed volume associated with the charger with the winding axis of the solenoid at an angle to the perpendicular to the surface of the charger coil, and the charger drive circuit drives the charger coil at a frequency near resonance of the circuit formed by the charger drive circuit and charger coil and the receiver electronic circuit and receiver coil when placed at the operation location and orientation, the magnetic field from the charger coil is guided through the core of the receiver coil acting as a magnetic flux guide and returns to close a magnetic loop via the charger magnetic layer to provide power transfer to the receiver.

2. The system of claim 1, whereby the charger coil is manufactured from a flexible printed circuit board.

3. The system of claim 1, whereby the winding axis of the receiver solenoid coil is placed at an angle with respect to the perpendicular to the surface of the charger during charging or powering of the mobile device and the magnetic flux from the charger coil is sufficiently guided to provide power transfer to the receiver electronics.

4. The system of claim 1, whereby the charger is incorporated into a second mobile device including an internal rechargeable battery and may be operated by the internal battery for a period of time.

5. The system of claim 4, whereby the second mobile device incorporating the charger also may in turn be charged or powered wirelessly.

6. The system of claim 4 or 5, whereby the second mobile device incorporating the charger further includes one or more additional wireless chargers or coils to charge additional mobile devices.

7. The system of claim 6, whereby the second mobile device can powered or charged through a wired DC power and can simultaneously wirelessly charge or power one or more mobile devices.

8. The system of claim 4, whereby the mobile device being wirelessly charged or powered also includes Bluetooth communication and communicates thereby with the second mobile device incorporating the charger.

9. The system of claim 1, whereby the charger drive circuit operates in the Zero Voltage Switching or Zero Current Switching mode.

10. The system of claim 1, whereby the charger includes a microcontroller and detects the presence of the receiver unit through a periodic ping process.

11. The system of claim 1, whereby the receiver and the charger include communication and control circuits and communicate therewith to establish or continue the charging process.

12. The system of claim 11, whereby the communication is through the charger and receiver coils.

13. The system of claim 12, whereby the communication between the receiver and charger is uni-directional.

14. The system of claim 12, whereby the communication between the receiver and charger is bi-directional.

15. The system of claim 1, whereby the magnetic field from the system is guided and contained so that the residual electromagnetic emissions near the system is are within the safe compliance values.

16. The system of claim 1, whereby the mobile device being charged or powered is a remote controller.

17. The system of claim 1, whereby the mobile device being charged or powered is a mouse.

18. A method for powering or charging a mobile device comprising:
providing
a charger including a charger coil generally having a substantially planar surface and a thin magnetic substantially planar layer and charger drive circuit including resonant capacitors to apply a voltage to the charger coil, and
a receiver, including a receiver coil and a receiver electronic circuits including one or more resonant capacitors and a rectifier, that is coupled to a mobile device for powering or charging the mobile device, whereby the receiver coil is a solenoid coil including a ferrite core with a relative magnetic permeability exceeding 1 with Litz wire wrapped around the ferrite core along the winding axis, together forming a solenoid, and the ferrite core extending beyond the ends of the wound wire section, wherein the solenoid coil is elongated such that the ends of the solenoid coil are smaller in their cross-sectional dimensions than the length of the solenoid along the winding axis, and
wherein the charger coil area is larger than the area of each of the ends of the solenoid and the coil has a geometry so when it is driven by the charger drive circuit, an inductive magnetic field in a direction substantially perpendicular to the substantially planar surface of the charger coil at the surface of the charger coil is generated, and
wherein when the receiver coil is placed near the surface of the charger coil in an enclosed volume associated with the charger with the winding axis of the solenoid at an angle to the perpendicular to the surface of the charger coil, and the charger drive circuit drives the charger coil at a frequency near the resonance of the circuit formed by the charger drive circuit and charger coil and the receiver electronic circuit and receiver coil when placed at the operation location and orientation, the magnetic field from the charger coil is guided through the core of the receiver coil acting as a magnetic flux guide and returns to close a magnetic loop via the charger magnetic layer to provide power transfer to the receiver.

19. A system for wireless charging comprising, a charger including a charger coil generally having a planar surface and a thin magnetic planar layer and charger drive circuit including resonant capacitors to apply an alternating voltage to the charger coil, a receiver, including a receiver coil and a receiver electronic circuit including one or more resonant capacitors and a rectifier, that is coupled to a mobile device for powering or charging the mobile device, wherein the receiver coil is a solenoid coil including a ferrite core with a relative magnetic permeability exceeding 1 with Litz wire wrapped around the ferrite core along the winding axis, together forming a solenoid, and the ferrite core extending beyond the ends of wherein the solenoid coil is elongated such that the ends of the solenoid coil are smaller in their cross-sectional dimensions than the length of the solenoid along the winding axis, and wherein the charger coil area is larger than the area of each of the ends of the solenoid and the charger coil has a geometry so when it is driven by the charger drive circuit, an inductive magnetic field in a direction perpendicular to the substantially planar surface of the charger coil at the surface of the charger coil is generated, and wherein when the receiver coil is placed near the surface of the charger coil in an enclosed volume associated with the charger with the winding axis of the solenoid at an angle to the perpendicular to the surface of the charger coil, and the charger drive circuit drives the charger coil at a frequency near resonance of the circuit formed by the charger drive circuit and charger coil and the receiver electronic circuit and receiver coil when placed at the operation location and orientation, the magnetic field from the charger coil is guided through the core of the receiver coil acting as a magnetic flux guide and returns to close a magnetic loop via the charger magnetic layer to provide power transfer to the receiver.

* * * * *

UNITED STATES PATENT AND TRADEMARK OFFICE
CERTIFICATE OF CORRECTION

PATENT NO. : 11,114,886 B2
APPLICATION NO. : 16/819503
DATED : September 7, 2021
INVENTOR(S) : Afshin Partovi It is certified that error appears in the above-identified patent and that said Letters Patent is hereby corrected as shown below:

In the Claims

Claim 19, Column 27, Line 17, insert at the end of the line -- the wound wire section, --

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*